US008411730B2

(12) United States Patent
Maeda et al.

(10) Patent No.: US 8,411,730 B2
(45) Date of Patent: Apr. 2, 2013

(54) SEMICONDUCTOR INTEGRATED COMMUNICATION CIRCUIT AND OPERATION METHOD THEREOF

(75) Inventors: Koji Maeda, Kodaira (JP); Taizo Yamawaki, Tokyo (JP); Yukinori Akamine, Kokubunji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 211 days.

(21) Appl. No.: 12/955,865

(22) Filed: Nov. 29, 2010

(65) Prior Publication Data

US 2011/0128992 A1 Jun. 2, 2011

(30) Foreign Application Priority Data

Nov. 30, 2009 (JP) .................................. 2009-271117

(51) Int. Cl.
*H04B 1/38* (2006.01)
(52) U.S. Cl. ........ 375/219; 375/146; 375/147; 375/213; 375/221; 375/260; 375/262; 375/265; 375/267
(58) Field of Classification Search .................. 375/146, 375/147, 213, 221, 224, 231, 259, 260, 262, 375/267; 455/42, 73; 702/79
See application file for complete search history.

(56) References Cited

U.S. PATENT DOCUMENTS 6,330,290 B1 * 12/2001 Glas .............................. 375/324
2009/0154595 A1 * 6/2009 Choksi et al. .................. 375/295

FOREIGN PATENT DOCUMENTS

| JP | 08-008775 A | 1/1996 |
| JP | 2004-040678 A | 2/2004 |
| JP | 2008-124965 A | 5/2008 |
| JP | 2008-263594 A | 10/2008 |

* cited by examiner

*Primary Examiner* — Dhaval Patel
(74) *Attorney, Agent, or Firm* — Miles & Stockbridge P.C.

(57) ABSTRACT

The semiconductor integrated communication circuit includes:
a low-noise amplifier; a receive mixer; a receive VCO; a demodulation-processing circuit; a modulation-processing circuit; a transmit mixer; a transmit VCO; a second-order-distortion-characteristic-calibration circuit; a quadrature-receive-signal-calibration circuit; and a test-signal generator. The test-signal generator generates first and second test signals using the transmit VCO. In the second-order-distortion-characteristic-calibration mode, the second-order-distortion-characteristic-calibration circuit variably changes an operation parameter of the receive mixer thereby to calibrate the second-order distortion characteristic to achieve its best condition while the first test signal is supplied to the receive mixer. In the quadrature-receive-signal-calibration mode, the quadrature-receive-signal-calibration circuit calibrates IQ mismatch of a quadrature receive signal to achieve the best condition thereof while the second test signal is supplied to the receive mixer. The integrated communication circuit can minimize the increase in chip footprint of a test-signal-generating circuit used to perform calibrations of both the second-order characteristic and IQ mismatch.

20 Claims, 18 Drawing Sheets

SEMICONDUCTOR INTEGRATED COMMUNICATION CIRCUIT AND OPERATION METHOD THEREOF

CLAIM OF PRIORITY

The Present application claims priority from Japanese application JP 2009-271117 filed on Nov. 30, 2009, the content of which is hereby incorporated by reference into this application.

FIELD OF THE INVENTION

The present invention relates to a semiconductor integrated communication circuit and an operating method thereof. Particularly, it relates to a technique useful for calibrating the second-order distortion characteristic of a receive mixer, and amplitude and phase mismatches of in-phase (I) and quadrature-phase (Q) components in a receiver.

BACKGROUND OF THE INVENTION

In recent years, research and development concerning direct-conversion type receivers (DCR) have been increasingly brisk in the field of radio communications, because of the advantages of higher packing densities, lower costs and simplicity of circuit structures. In addition to e.g. I/f noise, DC offset and IQ mismatch, the principal items to be taken into account in designing a direct-conversion type receiver (DCR) include the second-order intermodulation (IM2). The main cause of the second-order intermodulation (IM2) in a direct-conversion type receiver (DCR) is a down-conversion mixer.

Japanese Unexamined Patent Application Publication No. JP-A-8-8775 discloses a technique for calibrating a mixer in second-order distortion by generating a test signal in a direct-conversion type receiver. Particularly, the patent document JP-A-8-8775 points out, as a parameter to reduce the second-order distortion, the bias voltage of differential pair of mixers with reference to FIG. 2 thereof. Further, JP-A-8-8775 describes a method of creating a signal for inspection for the purpose of tentatively generating the second-order distortion with reference to FIG. 7, and it also describes a sequence for performing the detection and compensation of a nonlinear distortion with reference to FIG. 10.

Japanese Unexamined Patent Application Publication No. JP-A-2008-124965 discloses a technique for generating an RF test signal for calibration of a receive error and then calibrating a receive error (IQ mismatch) involved in I and Q transmit/receive baseband signals in a receive unit of a direct-conversion type receiver for the purpose of reducing the receive error. Particularly, FIG. 4 accompanying the patent document shows an RF test-signal-generating unit operable to generate an RF test signal for calibration of a receive error.

Further, Japanese Unexamined Patent Application Publication No. JP-A-2004-40678 discloses a demodulator arranged so that a circuit for phase error correction and a circuit for amplitude error correction correct a phase error of I and Q transmit/receive baseband signals produced by a quadrature-demodulation circuit and an amplitude error thereof, respectively.

In addition, Japanese Unexamined Patent Application Publication No. JP-A-2008-263594 discloses a technique for compensating the second-order intermodulation distortion (IM2 distortion) by means of a compensation current output from a compensation circuit independent of a path of an RF block including a mixer. The compensation circuit includes: a squaring circuit; a low-pass filter; and a variable-gain amplifier. An output from the RF block, and a compensation current from the variable-gain amplifier of the compensation circuit are supplied to an adder. A transmit power amplifier (PA) and a receive low-noise amplifier (LNA), which work as automatic calibration circuits for compensation, are turned off, a test signal for IM2 calibration is produced by a transmit circuit, and supplied to a receive circuit through a switch. However, according to another embodiment, a test signal generated by an internal signal source in the receive circuit is supplied to the receive circuit through a switch.

SUMMARY OF THE INVENTION

In regard to radio communication terminal devices like mobile phones, it has been required to reduce the number of constituent members from the viewpoint of cost cutting. Especially in recent years, the costs of radio communication terminal devices designed to support WCDMA are kept down by removal of an SAW (Surface-Acoustic-Wave) filter from a receiver. On the other hand, for common receivers for WCDMA, a direct conversion structure has been adopted, because direct-conversion type receivers need fewer circuits and can achieve a reduced power consumption easily as described above. The direct conversion technique is a method by which a receive signal of an RF frequency band is directly converted down to a baseband frequency band. Incidentally, WCDMA is an abbreviation for "Wideband Code-Division Multiple-Access".

Adopted for GSM mobile phones is TDD (Time-Division Duplex), by which a transmitter and a receiver substantially share the same frequency band as communication channel, each using a different time slot. Incidentally GSM is an abbreviation for "Global System for Mobile communication". In contrast, for WCDMA mobile phones, FDD (Frequency-Division Duplex) is adopted, by which a transmitter and a receiver use different communication channels, i.e. high and low frequency bands at the same time. Therefore, in the case of WCDMA scheme, which FDD is adopted for, a transmit signal of a transmitter makes a disturbing signal to a receiver. Particularly, in the case of a direct-conversion type receiver having no SAW filter on the receiver side, a transmit signal power supplied to the receiver is increased owing to having no SAW filter. At that time, if the second-order distortion characteristic of the receive mixer is bad, a component of second-order intermodulation (IM2) will overlap a receive baseband signal near DC, and thus degrade the sensitivity of signal receive.

Hence, a SAW-filter-less direct-conversion type receiver is required to have a large value as to a parameter referred to as "IIP2 (second-order Input Intercept Point)", which can be measured by the two-tone test. The IP2 (second-order Intercept Point) is, as known well, defined as an intersecting point of a line of first-order components and a line of second-order intermodulation distortion components (IM2 distortion) in a graph of input-output characteristics expressed by X and Y logarithmic coordinates. Further, the second-order input intercept point (IIP2) is a value of the second-order intercept point (IP2) in X coordinate. Therefore, having a large value as the second-order input intercept point (IIP2) means that the second-order intermodulation distortion component (IM2 distortion) is relatively smaller than the first order component. The second-order distortion characteristic of the second-order input intercept point (IIP2) is deteriorated owing to the unevenness of the mixers forming a differential pair in a mixer circuit. Only eliminating the unevenness in manufacturing of integrated circuits, and changing the chip layout thereof, it is still difficult to remedy the problem of the deterioration. Therefore, it becomes necessary to calibrate the second-order input intercept point (IIP2).

In regard to radio communication terminal devices of recent years, with the increase in data rate, communications according to QAM (Quadrature Amplitude Modulation) is becoming a mainstream, and therefore the need for a receiver with reduced noise is increasing. While there are various causes of the receiver noise, the noise coming from a local oscillator is dominant. The amplitude and phase mismatches between an in-phase (I) component and a quadrature (Q) phase component of an output of the receiver each make one factor which causes the deterioration of the noise characteristic of the receiver.

The method of calibrating the second-order distortion (second-order input intercept point (IIP2)) as described in JP-A-8-8775 is a method of reducing the second-order distortion by: arranging a pair of receive mixers to have a mechanism capable of variably changing the bias of the differential pair; generating a test signal for the two-tone test by use of a combination of a local oscillator and an amplitude-modulated-signal generator; and changing a parameter of the receive mixer by use of a distortion-output detector in a stage after the conversion to the I- and Q-channel baseband signals of the receiver and demodulation thereof.

The method of calibrating an IQ mismatch as disclosed by the patent document JP-A-2008-124965 is based on a method of reducing a receive error (IQ mismatch), which includes the step of supplying a test-signal-generating mixer with a post-division output from a voltage-control oscillator for transmission, and a post-division output from voltage-control oscillator for a digital interface, thereby causing the test-signal-generating mixer to output an RF test signal consisting of a one-tone signal of RF receive frequency band.

An idea common to the method of calibrating a second-order input intercept point (IIP2), and the method of calibrating an IQ mismatch is that as to both the methods, it is necessary to generate an RF test signal. However, the calibration of the second-order input intercept point (IIP2) necessitates supplying the receiver with a two-tone test signal arranged to mimic a strong input interference wave while keeping its amplitude large, whereas the calibration of the IQ mismatch using a convergence algorithm requires supplying the receiver with a one-tone signal arranged to mimic a receive signal while keeping its amplitude small. Further, a test signal of RF frequency band must be generated using an oscillator. However, if different frequency bands or different amplitude levels are required, for example, the calibration of the second-order input intercept point (IIP2) and the calibration of the IQ mismatch each necessitate a lock time to stabilize the oscillation frequency of a voltage-control oscillator (VCO) of a phase locked loop (PLL). Consequently, the increase in power consumption becomes a matter. Further, using different test-signal-generating circuits for these calibrations resents a problem of the increase in the chip footprint of a semiconductor integrated communication circuit chip. The above is what the inventor found from the study on the calibration methods described in the patent documents JP-A-8-8775 and JP-A-2008-124965.

The invention was made after the study performed by the inventors prior to the invention.

Therefore, it is an object of the invention to provide a semiconductor integrated communication circuit which can minimize the increase in the chip footprint of a test-signal-generating circuit for calibrating both of the second-order input intercept point (IIP2) and IQ mismatch.

It is another object of the invention to shorten both of the time required for calibration of the second-order input intercept point (IIP2) and the time required for calibration of IQ mismatch.

The above and other objects of the invention and novel features thereof will become clear from the description hereof and the accompanying drawings.

Of preferred embodiments of the invention herein disclosed, a representative embodiment will be outlined below in brief.

The embodiment materializes a semiconductor integrated communication circuit (RFIC) to be mounted in a radio communication terminal device, and having a function for performing radio frequency communication with a base station, which includes: a low-noise amplifier (1); a receive mixer (3, 4); a receive-voltage-control oscillator (19); a demodulation-signal-processing circuit (5-12); a modulation-signal-processing circuit (31-36); a transmit mixer (28, 29); and a transmit-voltage-control oscillator (22).

The integrated circuit further includes a second-order-distortion-characteristic-calibration circuit (42), a quadrature-receive-signal-calibration circuit (14) and a test-signal generator (20), which allows the integrated circuit to work in a second-order-distortion-characteristic-calibration mode and a quadrature-receive-signal-calibration mode in addition to a transmit/receive mode which involves the transmit and receive modes.

The test-signal generator (20) produces a first test signal ($f_{IIP2} \pm f_{TXLO}$) used in the second-order-distortion-characteristic-calibration mode, and a second test signal ($f_{IQ} + f_{TXLO}$) used in the quadrature-receive-signal-calibration mode, using an oscillating output signal from the transmit-voltage-control oscillator (22).

In the second-order-distortion-characteristic-calibration mode, the second-order-distortion-characteristic-calibration circuit variably changes an operation parameter of the receive mixer, thereby to calibrate a second-order distortion characteristic to achieve its best condition while the first test signal from the test-signal generator is supplied to the receive mixer (3, 4).

In the quadrature-receive-signal-calibration mode, the quadrature-receive-signal-calibration circuit calibrates phase and amplitude mismatches between an in-phase component (I) and a quadrature-phase component (Q) of the quadrature receive signal produced by the demodulation-signal-processing circuit to achieve a best condition of the signal while the second test signal from the test-signal generator is supplied to the receive mixer (3, 4) (see FIG. 1).

Next, the effect achieved by the embodiment of the invention is as follows in brief.

It is the invention can provide a semiconductor integrated communication circuit which can minimize the increase in the chip footprint of a test-signal-generating circuit for calibrating both of the second-order input intercept point (IIP2) and IQ mismatch.

DETAILED DESCRIPTION OF THE PREFERRED EMBODIMENTS

Figure 1:
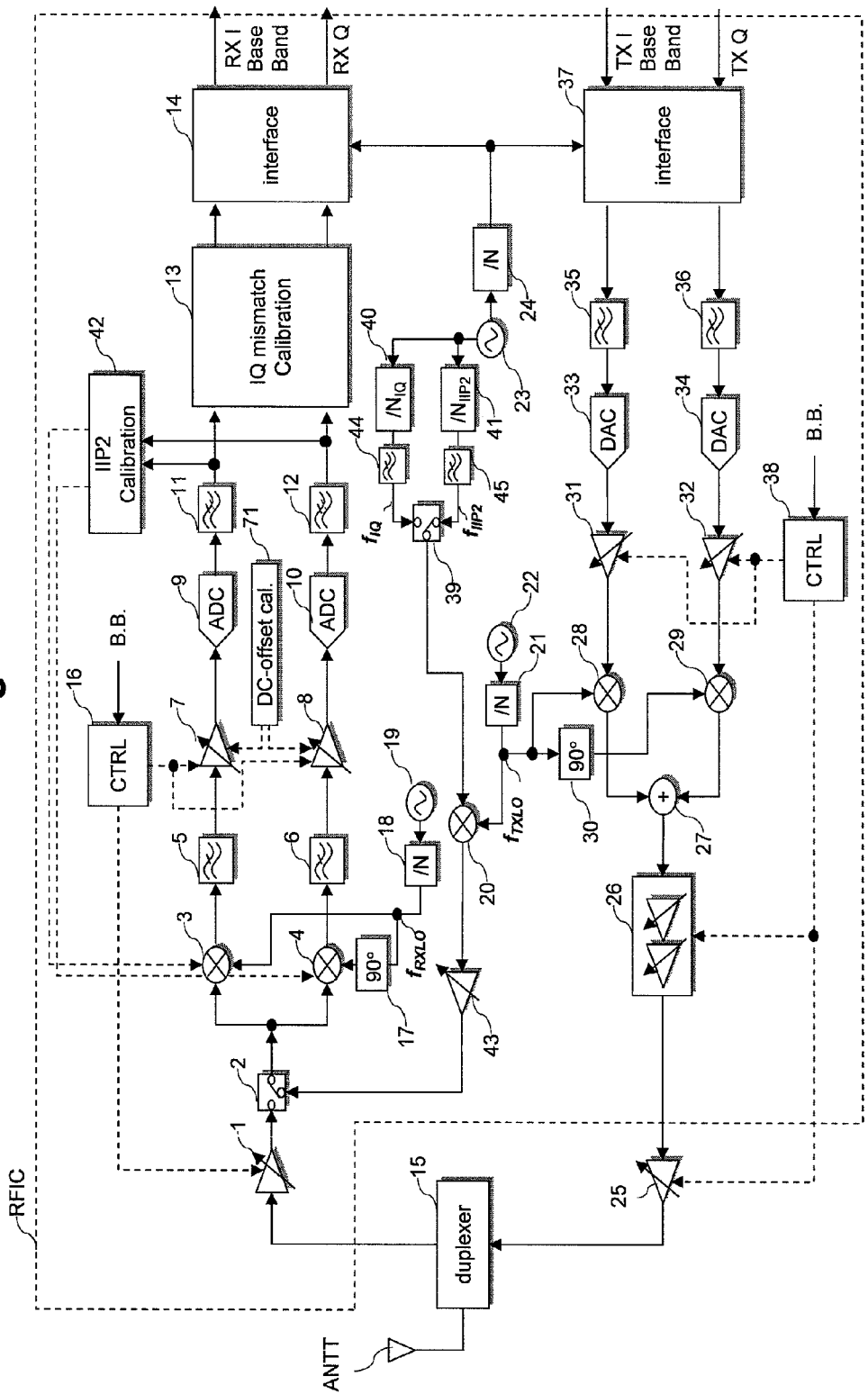
FIG. 1 is a diagram showing a structure of a radio-frequency semiconductor integrated circuit (RFIC) according to the first embodiment of the invention.

First, the preferred embodiments of the invention herein disclosed will be outlined. Here, the reference numerals, and characters for reference to the drawings, which are accompanied with paired round brackets, only show by example what the concepts of members and signals referred to by the numerals and characters contain.

[1] The form according to one preferred embodiment of the invention is a semiconductor integrated communication circuit (RFIC) to be mounted in a radio communication terminal device, and having a function for performing radio frequency communication with a base station, which includes: a low-noise amplifier (1); a receive mixer (3, 4); a receive-voltage-control oscillator (19); a demodulation-signal-processing circuit (5-12); a modulation-signal-processing circuit (31-36); a transmit mixer (28, 29); and a transmit-voltage-control oscillator (22).

The low-noise amplifier amplifies an RF receive signal received through an antenna (ANTT) of the radio communication terminal device.

The receive mixer accepts supply of an amplified RF signal from the low-noise amplifier through one input terminal thereof, and supply of an RF receive local signal produced in response to an oscillating output signal of the receive-voltage-control oscillator through the other input terminal.

The demodulation-signal-processing circuit processes a quadrature-demodulation-receive signal output from an output terminal of the receive mixer thereby to produce an quadrature receive signal.

In a receive mode of the integrated circuit, the pair of receive mixers and demodulation-signal-processing circuit take charge of processing the RF receive signal.

The modulation-signal-processing circuit handles a quadrature transmit signal.

The transmit mixer accepts supply of a quadrature transmit output signal from the modulation-signal-processing circuit through one input terminal thereof, and supply of an RF transmit local signal produced in response to an oscillating output signal of the transmit-voltage-control oscillator through the other input terminal.

In a transmit mode of the integrated circuit, the transmit mixer produces and outputs an RF transmit signal in response to an oscillating output signal from the transmit-voltage-control oscillator.

The integrated circuit further includes a second-order-distortion-characteristic-calibration circuit (42), a quadrature-receive-signal-calibration circuit (14), and a test-signal generator (20), which allows the integrated circuit to work in a second-order-distortion-characteristic-calibration mode and a quadrature-receive-signal-calibration mode in addition to a transmit/receive mode which enables the transmit and receive modes.

The test-signal generator (20) produces a first test signal ($f_{IIP2} \pm f_{TXLO}$) used in the second-order-distortion-characteristic-calibration mode, and a second test signal ($f_{IQ} + f_{TXLO}$) used in the quadrature-receive-signal-calibration mode, using an oscillating output signal from the transmit-voltage-control oscillator (22).

In the second-order-distortion-characteristic-calibration mode, the second-order-distortion-characteristic-calibration circuit variably changes an operation parameter of the receive mixer, thereby to calibrate a second-order distortion characteristic to achieve its best condition while the first test signal from the test-signal generator is supplied to the receive mixer (3, 4).

In the quadrature-receive-signal-calibration mode, the quadrature-receive-signal-calibration circuit calibrates phase and amplitude mismatches between an in-phase component (I) and a quadrature-phase component (Q) of the quadrature receive signal produced by the demodulation-signal-processing circuit to achieve a best condition of the signal while the second test signal from the test-signal generator is supplied to the receive mixer (3, 4) (see FIG. 1).

According to the embodiment, first and second test signals used in the second-order-distortion-characteristic-calibration mode, and quadrature-receive-signal-calibration mode can be generated by a commonly used test-signal generator (20) using an oscillating output signal from the transmit-voltage-control oscillator (22). Therefore, it is possible to provide a semiconductor integrated communication circuit which can minimize an increase of the chip footprint of the test-signal-generating circuit serving to perform calibrations for both the second-order input intercept point (IIP2) and IQ mismatch.

According to another preferred embodiment, the low-noise amplifier, receive mixers, receive-voltage-control oscillator, and demodulation-signal-processing circuit constitute one of a direct-down-conversion receiver and a low-IF receiver.

A surface-acoustic-wave (SAW) filter, which has been conventionally considered to be connected to one of input and output terminals of the low-noise amplifier of the one receiver, is eliminated (see FIG. 1).

According to another embodiment, the semiconductor integrated communication circuit includes a DC offset calibration circuit (71) connected with the demodulation-signal-processing circuit (5-12).

The DC offset calibration circuit executes a DC-offset-calibrating operation for calibrating DC offsets of the in-phase and quadrature-phase components of the quadrature receive signal produced by the demodulation-signal-processing circuit.

In the second-order-distortion-characteristic-calibration mode, the DC offset calibration circuit executes the DC-offset-calibrating operation every time the second-order-distortion-characteristic-calibration circuit variably changes the operation parameters of the receive mixers (see FIG. 1).

According to another preferred embodiment, after power-on of the semiconductor integrated communication circuit, an operation mode of the semiconductor integrated communication circuit is caused to transition in order of the second-order-distortion-characteristic-calibration mode, the quadrature-receive-signal-calibration mode, and the transmit/receive mode in turn.

The quadrature-receive-signal-calibration mode is enabled after the calibration of the second-order distortion characteristic to achieve its best condition, which involves the receive mixer, in the second-order-distortion-characteristic-calibration mode.

Figure 5:
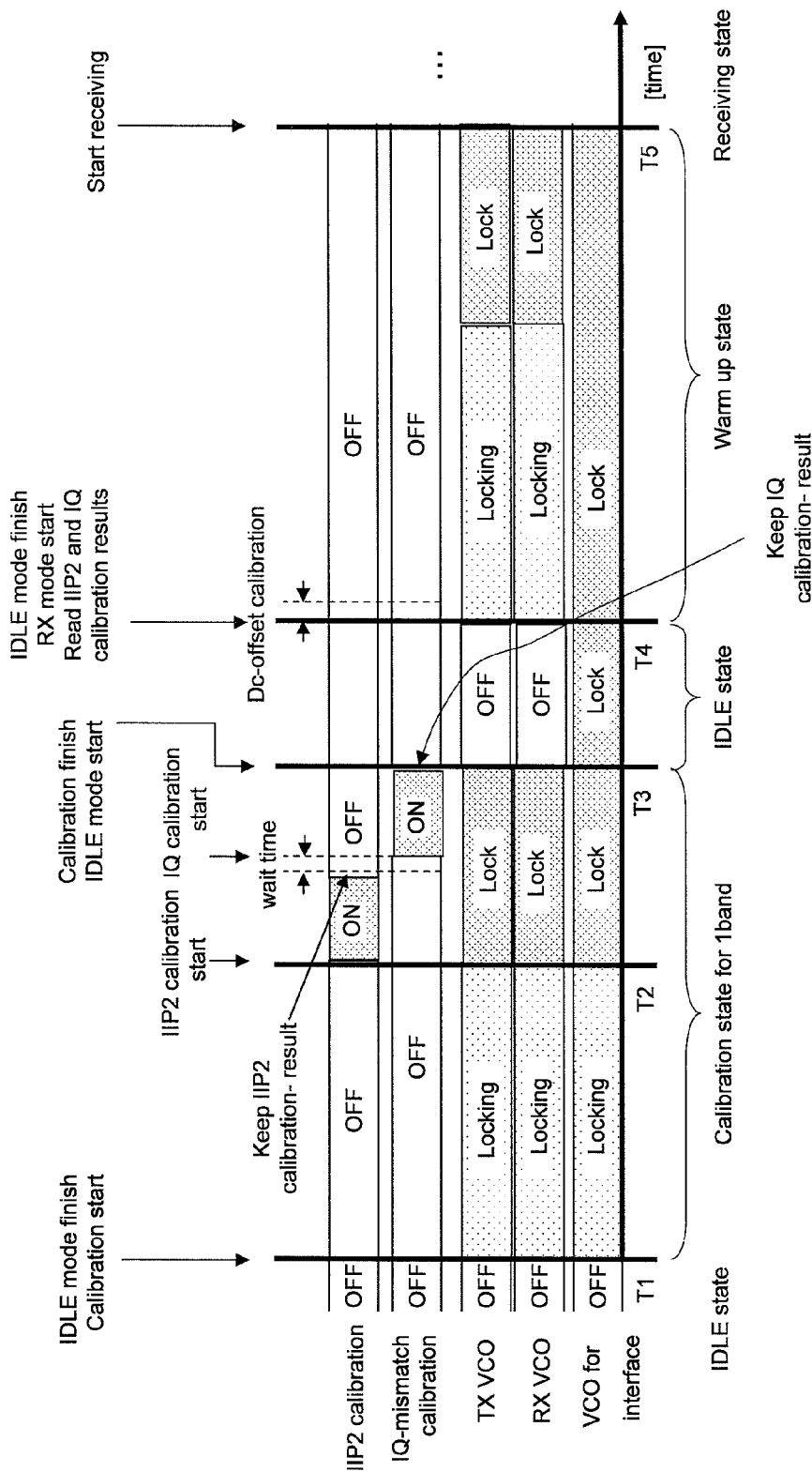
FIG. 5 is a diagram showing a single band-enabled calibration sequence of actions executed by RFIC according to the first embodiment of the invention shown in FIG. 1.

The transmit and receive modes are enabled after the calibration of the second-order distortion characteristic to achieve its best condition, which involves the receive mixer, in the second-order-distortion-characteristic-calibration mode, and after the calibration of the quadrature receive signal to achieve the best condition of the signal in the quadrature-receive-signal-calibration mode (see FIG. 5).

According to a more preferred embodiment, the semiconductor integrated communication circuit has a function for performing a radio frequency communication with a base station using multiple bands.

Figure 6:
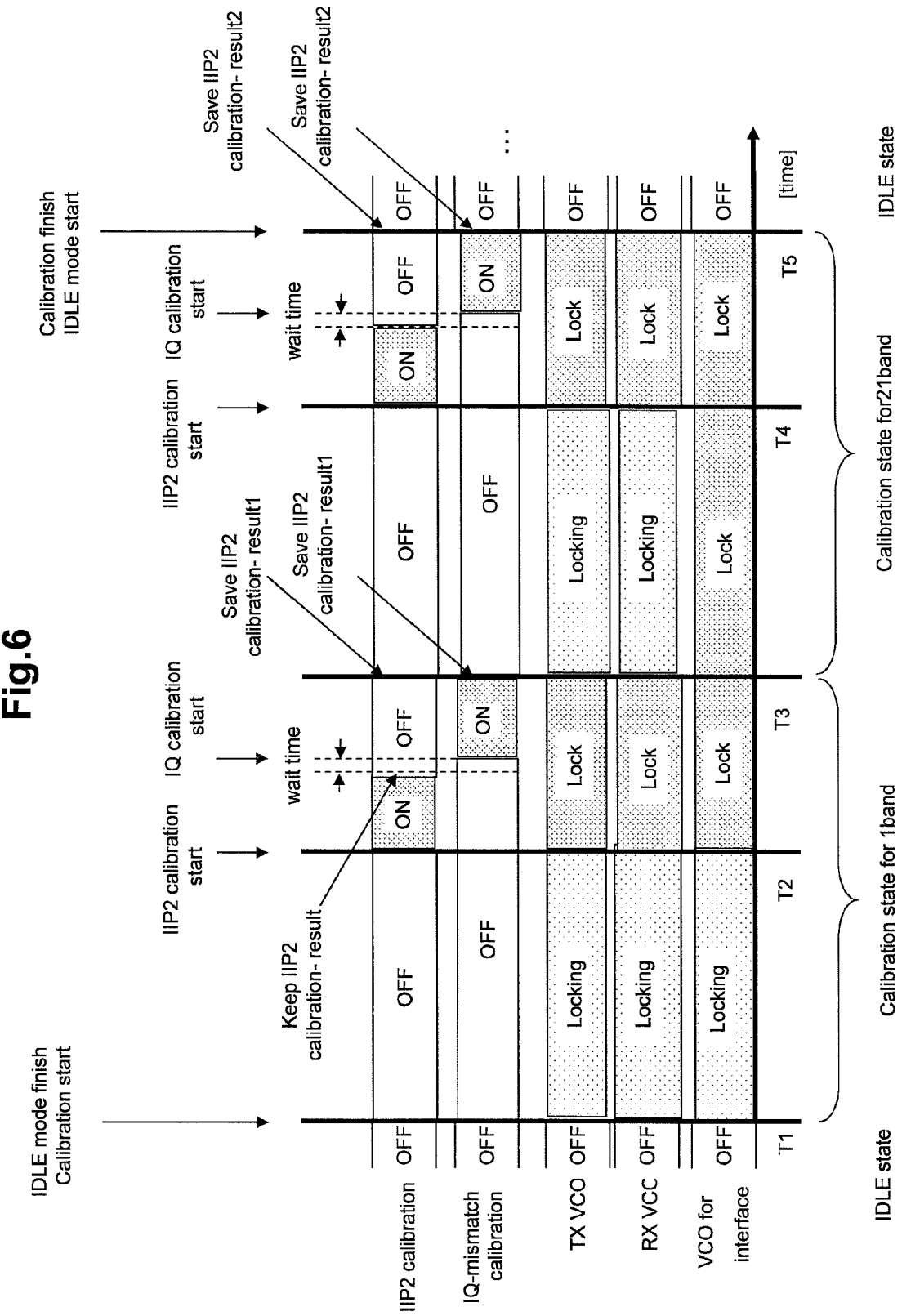
FIG. 6 is a diagram showing a multiband-enabled calibration sequence of actions executed by RFIC according to the first embodiment of the invention shown in FIG. 1.

The operation mode of the semiconductor integrated communication circuit is caused to transition in order of the second-order-distortion-characteristic-calibration mode, and the quadrature-receive-signal-calibration mode in turn for each of the multiple bands (see FIG. 6).

According to another more preferred embodiment, the semiconductor integrated communication circuit further includes a second oscillator (23, 51, 53).

The test-signal generator (20) produces a first test signal used in the second-order-distortion-characteristic-calibration mode, and a second test signal used in the quadrature-receive-signal-calibration mode, using a second oscillating output signal from the second oscillator, and the oscillating output signal from the transmit-voltage-control oscillator (22) (see FIGS. 1 and 20-23).

According to a concrete embodiment, the second oscillator which generates the second oscillating output signal is one of a voltage-control oscillator (23) used by a digital interface (14, 37), a reference-signal source (51), and a digital sine-wave signal source (53).

According to a more concrete embodiment, the second oscillator which generates the second oscillating output signal is the digital sine-wave signal source (53).

The semiconductor integrated communication circuit further includes a spreading circuit (54), and a de-spreading circuit (55).

The spreading circuit (54) is connected between an input terminal of the test-signal generator (20) and an output terminal of the digital sine-wave signal source (53).

Figure 22:
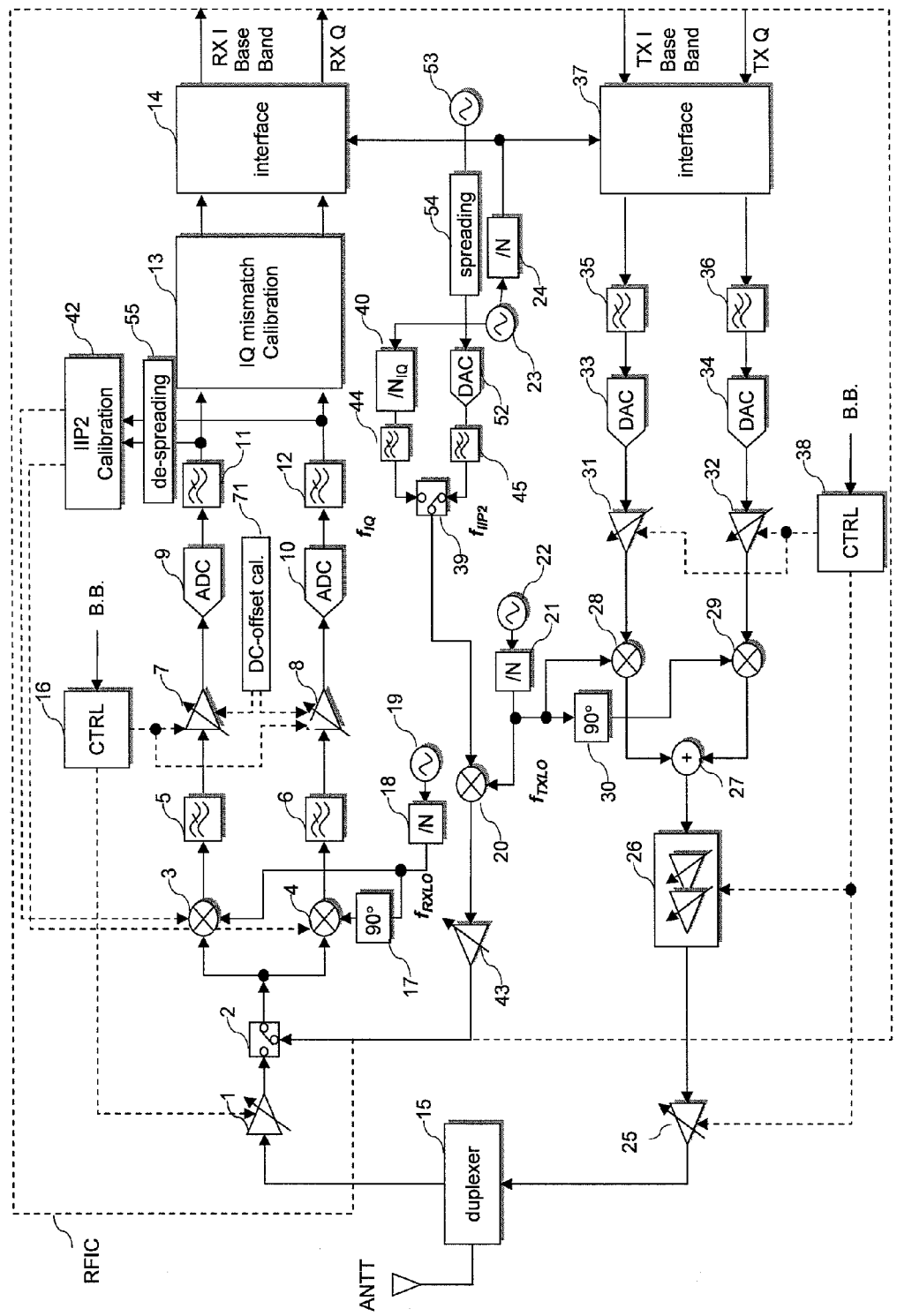
FIG. 22 is a diagram showing the structure of a radio-frequency semiconductor integrated circuit (RFIC) according to the fourth embodiment of the invention.

The de-spreading circuit (55) is connected between an output terminal of the demodulation-signal-processing circuit (5-12), and an input terminal of the second-order-distortion-characteristic-calibration circuit (42) (see FIG. 22).

According to another more concrete embodiment, the semiconductor integrated communication circuit further includes: a test-signal switch (2); and a test-signal-variable-gain amplifier (43).

The first and second test signals which the test-signal generator (20) generates and outputs through an output terminal thereof can be supplied to an input terminal of the test-signal-variable-gain amplifier (43).

First and second test amplified signals which the test-signal-variable-gain amplifier (43) produces and outputs through an output terminal thereof can be supplied to the pair of receive mixers (3, 4) through the test-signal switch (2) (see FIGS. 1 and 20-22).

According to the most concrete embodiment, the semiconductor integrated communication circuit further includes a test-signal switch (2) connected between an output terminal of the test-signal generator (20) and an input terminal of the low-noise amplifier (1).

Figure 23:
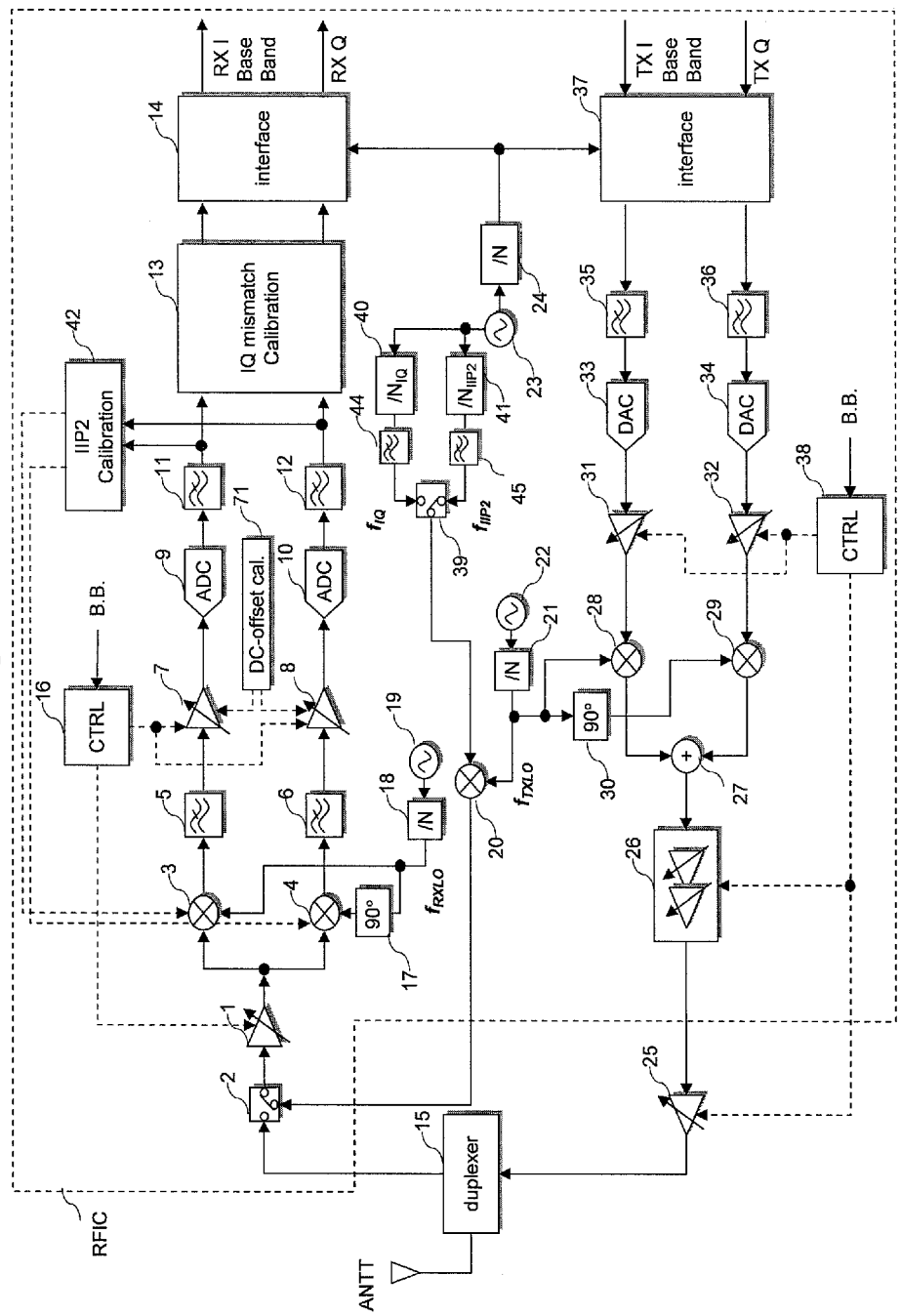
FIG. 23 is a diagram showing the structure of a radio-frequency semiconductor integrated circuit (RFIC) according to the fifth embodiment of the invention.

The first and second test signals which the test-signal generator (20) generates and outputs through the output terminal thereof can be supplied to the input terminal of the low-noise amplifier (1) through the test-signal switch (see FIG. 23).

[2] The form according to a preferred embodiment in another aspect of the invention is a method of operating a semiconductor integrated communication circuit (RFIC) to be mounted in a radio communication terminal device, and having a function for performing radio frequency communication with a base station, which includes: a low-noise amplifier (1); a receive mixer (3, 4); a receive-voltage-control oscillator (19); a demodulation-signal-processing circuit (5-12); a modulation-signal-processing circuit (31-36); a transmit mixer (28, 29); and a transmit-voltage-control oscillator (22).

The low-noise amplifier amplifies an RF receive signal received through an antenna (ANTT) of the radio communication terminal device.

The receive mixer accepts supply of an amplified RF signal from the low-noise amplifier through one input terminal thereof, and supply of an RF receive local signal produced in response to an oscillating output signal of the receive-voltage-control oscillator through the other input terminal.

The demodulation-signal-processing circuit processes a quadrature-demodulation-receive signal output from an output terminal of the receive mixer thereby to produce an quadrature receive signal.

In a receive mode of the integrated circuit, the pair of receive mixers and demodulation-signal-processing circuit take charge of processing the RF receive signal.

The modulation-signal-processing circuit handles a quadrature transmit signal.

The transmit mixer accepts supply of a quadrature transmit output signal from the modulation-signal-processing circuit through one input terminal thereof, and supply of an RF transmit local signal produced in response to an oscillating output signal of the transmit-voltage-control oscillator through the other input terminal.

In a transmit mode of the integrated circuit, the transmit mixer produces and outputs an RF transmit signal in response to an oscillating output signal from the transmit-voltage-control oscillator.

The integrated circuit further includes a second-order-distortion-characteristic-calibration circuit (42), a quadrature-receive-signal-calibration circuit (14) and a test-signal generator (20), which allows the integrated circuit to work in a second-order-distortion-characteristic-calibration mode and a quadrature-receive-signal-calibration mode in addition to a transmit/receive mode which involves the transmit and receive modes.

The test-signal generator (20) produces a first test signal ($f_{IIP2} \pm f_{TXLO}$) used in the second-order-distortion-characteristic-calibration mode, and a second test signal ($f_{IQ}+f_{TXLO}$) used in the quadrature-receive-signal-calibration mode, using an oscillating output signal from the transmit-voltage-control oscillator (22).

The operating method includes the steps of: using the second-order-distortion-characteristic-calibration circuit, in the second-order-distortion-characteristic-calibration mode, to variably change an operation parameter of the receive mixer, thereby to calibrate a second-order distortion characteristic to achieve its best condition while the first test signal from the test-signal generator is supplied to the receive mixer (3, 4); and using the quadrature-receive-signal-calibration circuit, in the quadrature-receive-signal-calibration mode, to calibrate phase and amplitude mismatches between an in-phase component (I) and a quadrature-phase component (Q) of the quadrature receive signal produced by the demodulation-signal-processing circuit to achieve a best condition of the signal while the second test signal from the test-signal generator is supplied to the receive mixer (3, 4) (see FIG. 1).

According to the above embodiment, it is possible to provide a semiconductor integrated communication circuit which can minimize an increase of the chip footprint of the test-signal-generating circuit serving to perform calibrations for both the second-order input intercept point (IIP2) and IQ mismatch.

2. Further Detailed Description of the Preferred Embodiments

The preferred embodiments of the invention will be described further in detail. It is noted that as to all the drawings to which reference is made in describing the preferred forms for embodying the invention, constituent members identical in function are identified by the same reference numeral or character, and the repeated description thereof is avoided here.

First Embodiment

<<Structure of RFIC>>

FIG. 1 is a diagram showing a structure of a radio-frequency semiconductor integrated circuit (RFIC) according to the first embodiment of the invention.

For RFIC according to an embodiment of the invention, receive-SAW-filter-less, direct-conversion type transmitter-receiver pursuant to UMTS standard are adopted. Now, it is noted that UMTS stands for Universal Mobile Telecommunications System.

The receiver of RFIC shown in FIG. 1 is composed of a direct conversion type receiver (DCR) having a function for calibrating the second-order input intercept point (IIP2), and a function for calibrating IQ mismatch.

A mobile phone terminal device with RFIC mounted therein shown in FIG. 1 includes: an antenna ANTT; a low-noise amplifier (LNA) 1; switches 2 and 39; a pair of receive mixers 3 and 4; a test-signal-generating mixer 20; a pair of transmit mixers 28 and 29; low-pass filters (LPF) 5, 6, 11, 12, 35, 36, 44 and 45; variable-gain amplifiers (PGA) 7, 8, 26, 31, 32 and 43; analog-to-digital converters (ADC) 9 and 10; an IQ mismatch-calibration circuit 13; an IIP2 calibration circuit 42; digital interfaces 14 and 37; a duplexer 15; gain controllers 16 and 38; 90-degree phase shifters 17 and 30; dividers 18, 21, 24, 40 and 41; a receive-voltage-control oscillator (RXVCO) 19; a transmit-voltage-control oscillator (TXVCO) 22; a digital-interface-voltage-control oscillator (VCO) 23; an adder 27; an RF power amplifier (PA) 25; digital-to-analog converters (DAC) 33 and 34; a DC offset calibration circuit 71. In the mobile phone terminal device shown in FIG. 1, constituent members inside the area enclosed by a broken line are integrated into the semiconductor chip of RFIC.

<<Three Operation Modes>>

The RFIC according to the first embodiment of the invention shown in FIG. 1 is operable in three operation modes, i.e. Transmit/receive mode, IIP2 calibration mode, and IQ mismatch calibration mode.

In "Transmit/receive mode", the mobile phone terminal device with RFIC shown in FIG. 1 mounted therein executes transmit and receive operations, thereby to communicate with a base station by radio.

In "IIP2 calibration mode", RFIC shown in FIG. 1 calibrates the characteristic of a second-order intermodulation distortion component (IM2 distortion) produced by the fluctuations of the differential pair of receive mixers 3 and 4.

In "IQ mismatch calibration mode", RFIC shown in FIG. 1 calibrates an IQ mismatch caused by a relative variation between receive-baseband-processing signals of I and Q channels of a receiver.

The RFIC shown in FIG. 1 is arranged so that at power-on, its operation mode transitions in the order, "IIP2 calibration mode", "IQ mismatch calibration mode" and "Transmit/receive mode", in turn. The operation of RFIC shown in FIG. 1 in "Transmit/receive mode" will be described below.

<<Transmit/Receive Mode>>

Figure 4:
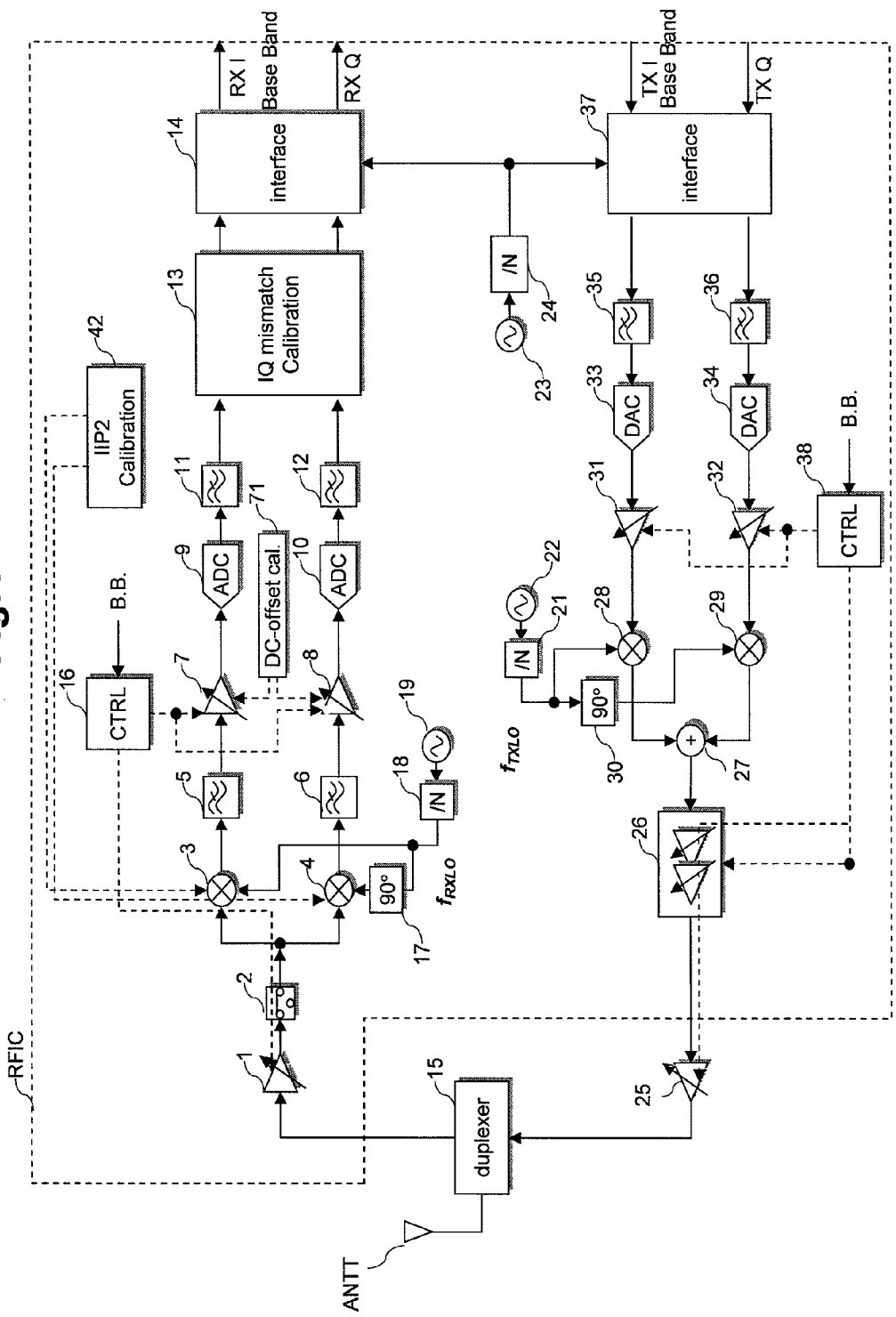
FIG. 4 is a diagram for explaining an operation of RFIC according to the first embodiment of the invention shown in FIG. 1 in "Transmit/receive mode"

Referring to FIG. 4, an operation of RFIC according to the first embodiment of the invention shown in FIG. 1 in "Transmit/receive mode" will be described. Now, it is noted that of constituent members in RFIC shown in FIG. 1, only circuit parts associated with the members working in Transmit/receive mode are shown in FIG. 4.

<Transmit Operation>

First, referring to FIG. 4, the transmit operation in "Transmit/receive mode" will be described. I and Q digital baseband transmit signals are supplied to RFIC through a digital interface circuit 37 composed of a circuit compliant with LVDS (Low Voltage Differential Signaling) or the like from a baseband signal processing circuit referred to as "baseband processor", and then provided to the low-pass filters (LPF) 35 and 36, where high frequency noises are removed from the signals. The digital interface circuit 37 works on a clock signal produced by a combination of the digital-interface-voltage-control oscillator (VCO) 23 and divider 24.

After that, the I and Q digital baseband transmit signals are converted to analog signals by the digital-to-analog converters (DAC) 33 and 34. Then, the resultant analog signals are entered into the variable-gain amplifiers (PGA) 31 and 32, and adjusted in signal level. The I and Q analog baseband transmit signals arising from output terminals of the variable-gain amplifiers (PGA) 31 and 32 are supplied to the transmit mixers 28 and 29, where the signals are multiplied by transmit RF local signals and converted up in frequency into I and Q RF transmit signals in RF frequency band. The transmit RF local signals are produced by a combination of the transmit-voltage-control oscillator (TXVCO) 22, divider 21, 90-degree phase shifter 30. The I and Q RF transmit signals are added up by the adder 27, adjusted in signal level by the variable-gain amplifier (PGA) 26 again, amplified in power by the RF power amplifier (PA) 25, and then output through the antenna ANTT. The gains of the variable-gain amplifiers (PGA) 31, 32 and 26, and RF power amplifier (PA) 25 are set by the gain controller 38 in response to notifications of appropriate gain settings from the baseband signal processing circuit, which is referred to as "baseband processor".

<Receive Operation>

Next, referring to FIG. 4, the receive operation in "Transmit/receive mode" will be described.

After RFIC has received an RF receive signal from a mobile phone base station through the antenna ANTT, the low-noise amplifier (LNA) 1 amplifies the RF receive signal. Thereafter, the RF receive signal is supplied to the pair of receive mixers 3 and 4 through the switch 2, multiplied by a pair of receive RF local signals, and converted down in frequency into I and Q receive baseband signals differing in phase by 90 degrees. The pair of receive RF local signals are produced by a combination of the receive-voltage-control oscillator (RXVCO) 19, divider 18, and 90-degree phase shifter 17. Then, I and Q receive baseband signals are supplied to the low-pass filters (LPF) 5 and 6, and subjected to removal of interfering waves there. Thereafter, the I and Q receive baseband signals are passed to the variable-gain amplifiers (PGA) 7 and 8, and adjusted in its level there. The gains of the variable-gain amplifiers (PGA) 7 and 8, and low-noise amplifier (LNA) 1 are set by the gain controller 16 in response to notifications of appropriate gain settings from the baseband signal processing circuit, which is referred to as "baseband processor". The DC offset calibration circuit 71 has a function for detecting and reducing input DC offset voltages of the variable-gain amplifiers (PGA) 7 and 8. By activating the DC offset calibration circuit 71 to reduce the DC offset voltages of the receiver before start of signal reception, a measure is taken to prevent an input signal level from changing beyond the input dynamic range of the analog-to-digital converters (ADC) 9 and 10 at the time when I and Q receive baseband signals reach the maximum amplitudes.

The I and Q receive baseband signals are thereafter converted to digital signals by the analog-to-digital converters (ADC) 9 and 10, and then subjected to removal of interfering waves and quantization noises resulting from the analog-to-digital conversions by the digital low-pass filters (LPF) 11 and 12. The resultant I and Q receive digital baseband signals output from the digital low-pass filters (LPF) 11 and 12 are supplied to the IQ mismatch-calibration circuit 13, where amplitude and phase mismatches involved in the I and Q receive digital baseband signals can be corrected. This is because in "IQ mismatch calibration mode", the IQ mismatch-calibration circuit 13 sets correction values for I and Q mismatches in the receiver, which is to be described later. The I and Q receive digital baseband signals output by the IQ mismatch-calibration circuit 13 are conveyed through the digital interface circuit 14 composed of a circuit compliant with LVDS (Low Voltage Differential Signaling) or the like to the baseband signal processing circuit referred to as "baseband processor", where the demodulation is executed on the signals. The digital interface circuit 14 works on a clock signal produced by a combination of the digital-interface-voltage-control oscillator (VCO) 23 and divider 24.

On another note, the receive-SAW-filter-less, direct-conversion type receiver does not have a SAW filter, which is connected to an output of the low-noise amplifier (LNA) 1 in a direct-conversion type receiver with a built-in SAW. Therefore, the interfering wave reduction curve of the receive-SAW-filter-less, direct-conversion type receiver is lower than that of a direct-conversion type receiver with a built-in SAW by about 20 dB or larger as described above. In WCDMA system, a transmit signal output by a transmitter makes an interfering wave with a receiver, as already described. Particularly, in a case where a mobile phone terminal device communicates with a maximum transmit power in spite of keeping the minimum receive power, it is difficult to ensure a given receive S/N ratio. It is specified by the standards of 3GPP (3rd Generation Partnership Project), a project to consider and prepare the specifications of the third generation mobile phone system, that the minimum receive sensitivity is −117 dBm, and the maximum transmit power is +21 dBm in the case of Class 4. The duplexer 15 provides an isolation of about 50 dB between the input of the receiver and the output of the transmitter, however a transmit signal of about −30 dBm is supplied to the input of the receiver at the maximum transmit power. Under the circumstances, because of the removal of SAW filter from the receiver, the calibration of the second-order distortion is needed to reduce the second-order intermodulation distortion component (IM2 distortion).

<Second-Order Input Intercept Point (IIP2)>

Figure 18:
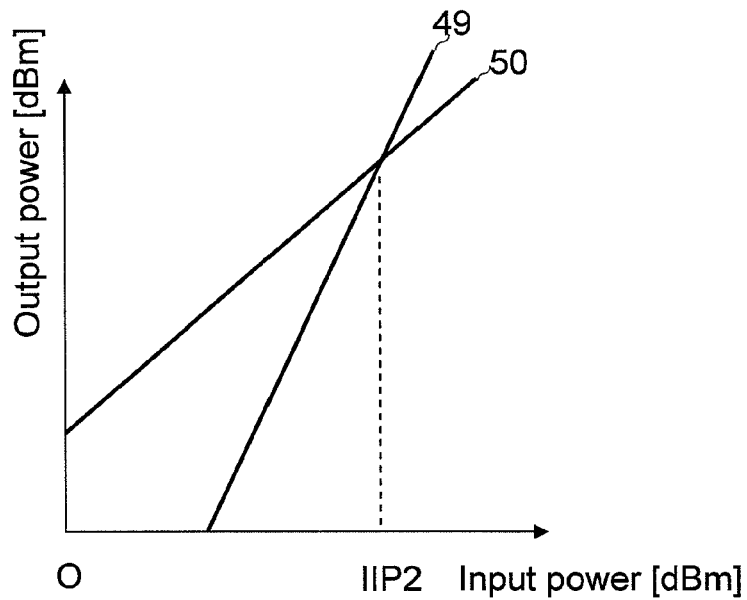
FIG. 18 is a diagram for explaining the second-order intercept point (IP2) of a receiver and the second-order input intercept point (IIP2)

The forementioned second-order input intercept point (IIP2) is used as an index of the second-order distortion characteristics. FIG. 18 is a diagram for explaining the second-order intercept point (IP2) of the receiver and the second-order input intercept point (IIP2). As described at the outset, the second-order intercept point (IP2) is defined as the intersecting point of a line of the first-order components and a line of second-order intermodulation distortion components (IM2 distortion) in a graph of input-output characteristics expressed by X and Y logarithmic coordinates. Further, the second-order input intercept point (IIP2) corresponds to a value of the second-order intercept point (IIP2) in X coordinate. In the graph of input-output characteristics expressed by X and Y logarithmic coordinates of FIG. 18, the line 50 represents the first-order component of a fundamental wave and has a slope of one, whereas the line 49 represents the second-order intermodulation distortion component (IM2 distortion) and has a slope of two. The intersecting point of the lines 49 and 50 makes a second-order intercept point (IP2), the value of the intersecting point in x-coordinate is the second-order input intercept point (IIP2).

In general, the characteristic of second-order input intercept point (IIP2) of a receiver depends on a pair of receive mixers which are supplied with an RF receive signal amplified in power by a low-noise amplifier (LNA). The IIP2 characteristic of a differential pair of receive mixers is worsened by the unbalance between the receive mixers. Therefore, if the receiver is arranged to have a mechanism capable of variably changing parameters, such as the phase of a local parallel input part, and the load resistance value and bias voltage of a differential pair of receive mixers, it becomes possible to correct the unbalance between the differential pair of receive mixers, whereby the second-order input intercept point (IIP2) can be made variable, as described in the patent document JP-A-8-8775.

Figure 19:
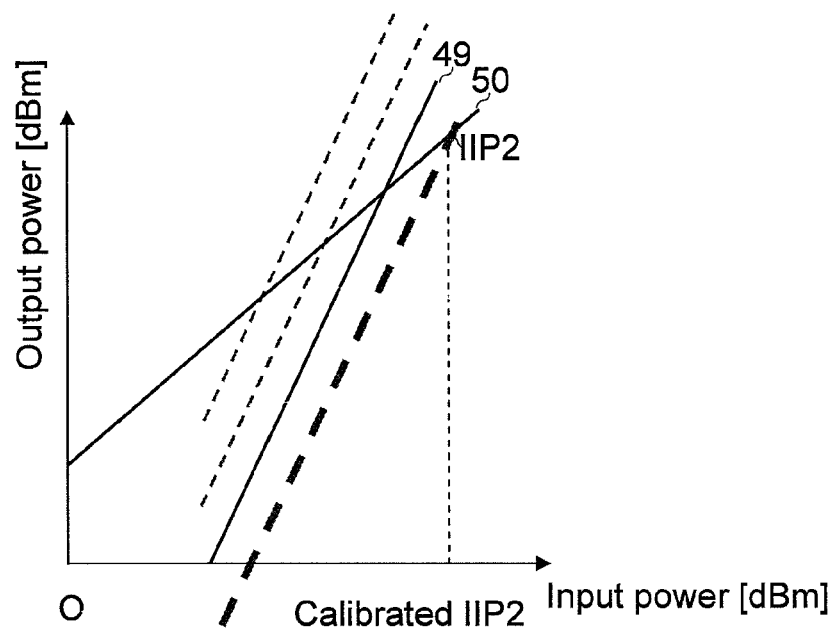
FIG. 19 is a diagram for explaining an effect of making variable the parameter of the differential pair of receive mixers, showing that a parallel shift of the line 49 of a slope of two representing the second-order intermodulation distortion component (IM2 distortion) caused by changing the parameter changes the second-order intercept point (IP2) and second-order input intercept point (IIP2)

FIG. 19 is a diagram for explaining an effect of making variable the parameter of the differential pair of receive mixers, showing that a parallel shift of the line 49 of a slope of two representing the second-order intermodulation distortion component (IM2 distortion) caused by changing the parameter changes the second-order intercept point (IP2) and second-order input intercept point (IIP2).

As shown in FIG. 19, the second-order input intercept point (IIP2) can be improved to take its maximum value (Calibrated IIP2) changing the line 49, representing the second-order intermodulation distortion component (IM2 distortion), to its minimum level (drawn by a heavy broken line). As to the various embodiments of the invention, the calibrating operation of setting the second-order intermodulation distortion component (IM2 distortion) to its minimum level, thereby to setting the second-order input intercept point (IIP2) to its maximum value (Calibrated IIP2) shall be referred to as "IIP2 calibration", and the calibrating operation is executed in "IIP2 calibration mode", which will be described later.

The RFIC shown in FIG. 4, the IIP2 calibration circuit 42 is connected to the pair of receive mixers 3 and 4. In a control register of the IIP2 calibration circuit 42, a setting information of a parameter when the second-order intermodulation distortion component (IM2 distortion) is made its minimum level, namely when the best second-order distortion characteristic is achieved, is stored during a period of the operation mode "IIP2 calibration mode", which will be described later. After that, the setting information when the best second-order distortion characteristic is achieved is reflected on the pair of receive mixers 3 and 4 at transition of the operation mode of RFIC shown in FIG. 4 to the "Transmit/receive mode".

<DC Offset Calibration>

Further, in RFIC shown in FIG. 4, the DC offset calibration circuit 71 is connected to the variable-gain amplifiers (PGA) 7 and 8. During the "IIP2 calibration mode", the DC offset calibration circuit 71 executes a DC offset calibration to cancel the DC offset voltage of the variable-gain amplifiers (PGA) 7 and 8 each time the setting information of the pair of receive mixers 3 and 4 is updated. The DC offset calibration will be described later in detail.

<IQ Mismatch>

With RFIC shown in FIG. 4, each pair I and Q digital receive baseband signals output by the analog-to-digital converters (ADC) 9 and 10 are identical in amplitude, but differ in phase by 90 degrees, ideally. However, in reality, the unevenness of devices owing to the variations of semiconductor manufacturing processes of RFIC leads to the difference between the paired circuit members, e.g. the receive mixers 3 and 4, the low-pass filters (LPF) 5 and 6, the variable-gain amplifiers (PGA) 7 and 8, and the analog-to-digital converters (ADC) 9 and 10. As a result, a mismatch is caused between I and Q receive digital baseband signals arising from outputs of the analog-to-digital converters (ADC) 9 and 10 in amplitude and phase.

Figure 15:
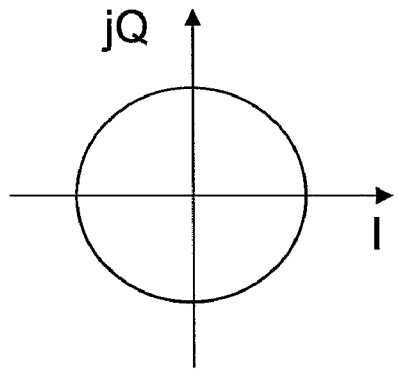
FIG. 15 is a diagram showing a constellation in an ideal condition where no mismatch is caused between I and Q receive baseband signals in amplitude and phase.

FIG. 15 is a diagram showing a constellation in an ideal condition where no mismatch is caused between I and Q receive baseband signals in amplitude and phase. The constellation can be obtained by performing measurements as described below. For example, on condition that the receiver is supplied with a sine wave having a frequency of 1 GHz, and the frequency of the RF receive local signal is set to 999 MHz, a sine wave of a frequency of 1 MHz and a cosine wave of a frequency of 1 MHz are produced as I and Q receive baseband signals. Now, it is noted that 1999-MHz sine and cosine waves of image-wave components are totally removed by the low-pass filters (LPF) 5 and 6. If the amplitudes of 1-MHz sine wave and 1-MHz cosine wave are represented by I and Q respectively, and a point given by I+jQ is plotted in a complex plane, the constellation as shown in FIG. 15 is obtained.

In case that there is no difference between paired circuit members in RFIC shown in FIG. 4, ideal sine and cosine waves can be obtained with respect to one pair I and Q receive baseband signals, and therefore the constellation forms a complete circle as shown in FIG. 15. However, if a mismatch is caused between I and Q signals in phase and amplitude, no perfect circle is formed.

Figure 16:
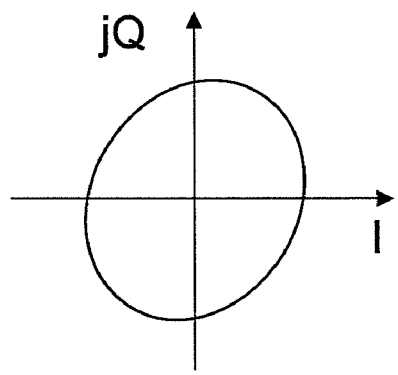
FIG. 16 is a diagram showing the deterioration of a constellation with a phase mismatch caused between I and Q receive baseband signals.
Figure 17:
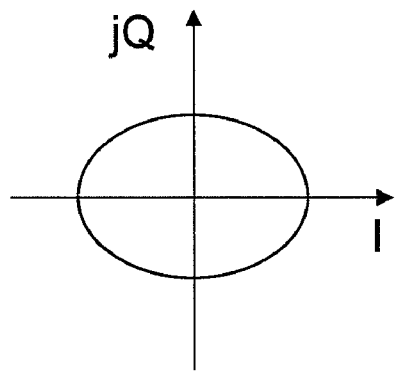
FIG. 17 is a diagram showing the deterioration of a constellation with an amplitude mismatch caused between I and Q receive baseband signals.

FIG. 16 is a diagram showing the deterioration of a constellation with a phase mismatch caused between I and Q receive baseband signals. FIG. 17 is a diagram showing the deterioration of a constellation with an amplitude mismatch caused between I and Q receive baseband signals. In both the cases, the constellations do not take the form of a perfect circle, and therefore amplitude and phase data deteriorate.

In communication based on amplitude/phase modulation, e.g. quadrature amplitude modulation (QAM), by which the communication data rate can be increased, the IQ mismatch deteriorates the quality of communication. Further, in the multilevel modulation, by which the data rate can be increased, the IQ mismatch causes a remarkable deterioration in the communication quality.

In RFIC shown in FIG. 4, I and Q receive digital baseband signals produced by the analog-to-digital converters (ADC) 9 and 10 are passed to the digital low-pass filters (LPF) 11 and 12, and then supplied to the IQ mismatch-calibration circuit 13. During the period of "IQ mismatch calibration mode", which will be described later, the IQ mismatch-calibration circuit 13 gains the setting information which enables the reduction of IQ mismatch. After that, at transition of the operation mode of RFIC shown in FIG. 4 to "Transmit/receive mode", the IQ mismatch-calibration circuit 13 provides the digital interface 14 with the I and Q receive digital baseband signals with IQ mismatch reduced in phase and amplitude. Specifically, in RFIC shown in FIG. 4, one tone signal is generated and supplied to the pair of receive mixers 3 and 4. Then the detection of IQ mismatch is performed to calculate a correction value, using a convergence algorithm. The correction result thus calculated is stored in the control register. After that, at transition of the operation mode of RFIC shown in FIG. 4 to "Transmit/receive mode", the setting information to calibrate the IQ mismatch is reflected on the IQ mismatch-calibration circuit 13. The calibration of IQ mismatch will be described later.

<<IIP2 Calibration Mode>>

Figure 2:
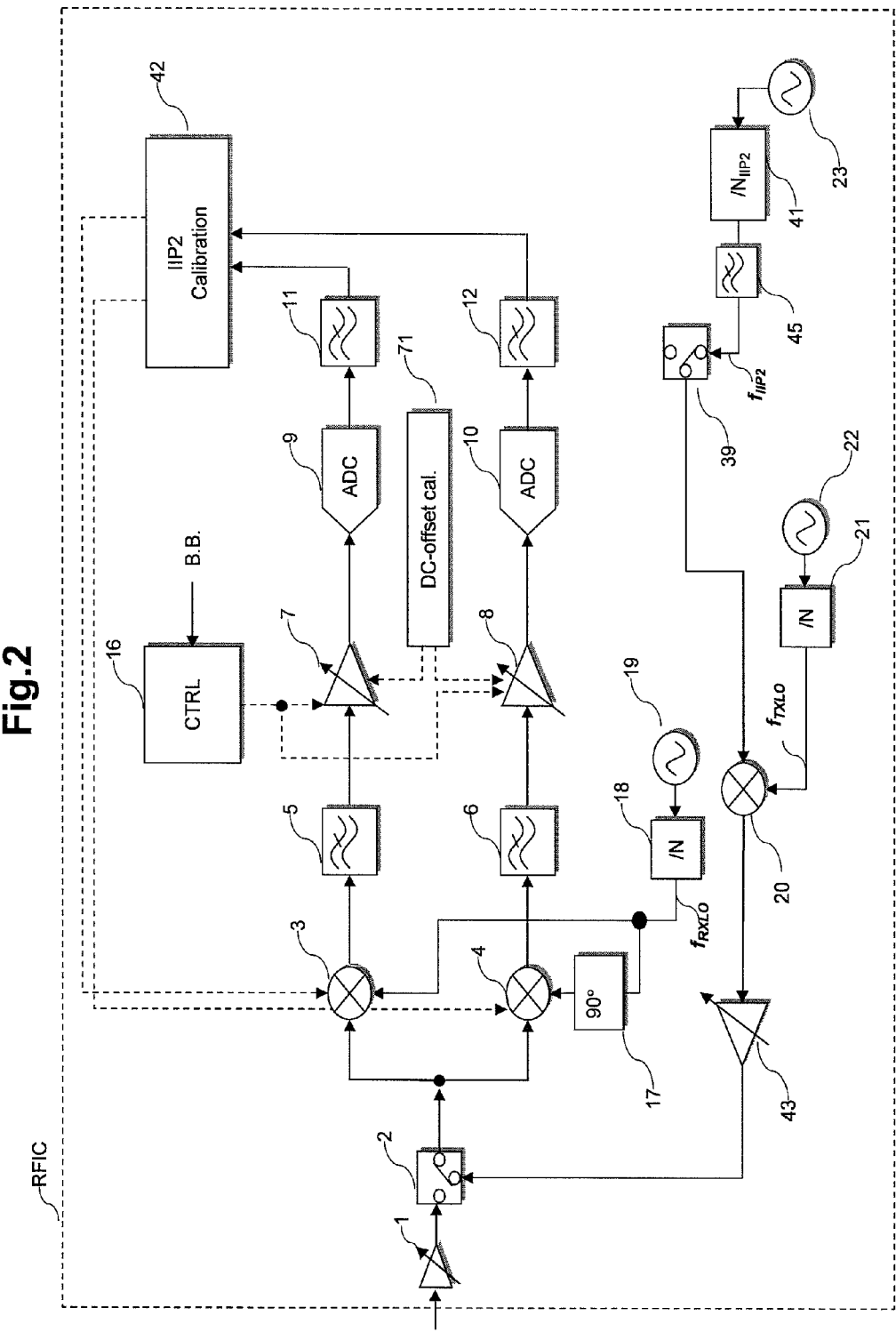
FIG. 2 is a diagram for explaining an operation of RFIC according to the first embodiment of the invention shown in FIG. 1 in "IIP2 calibration mode"

Here, an operation of RFIC according to the first embodiment of the invention shown in FIG. 1 in "IIP2 calibration mode" will be described with reference to FIG. 2. It is noted that of constituent members in RFIC shown in FIG. 1, only circuit parts associated with the members working in IIP2 calibration mode are shown in FIG. 2.

In RFIC, the digital-interface-voltage-control oscillator (VCO) 23 generates an oscillating output signal, and the divider 41 divides the signal thereby to produce a clock signal having a frequency of $f_{IIP2}$. After that, the low-pass filter (LPF) 45 suppresses harmonics with respect to the frequency $f_{IIP2}$ to make the clock signal closer to an ideal sine wave.

Figure 7:
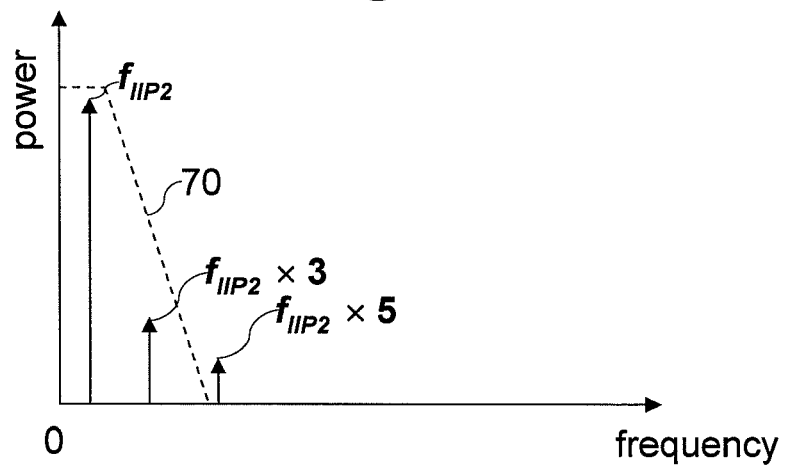
FIG. 7 is a diagram showing the frequency spectrum of an output signal of the low-pass filter (LPF) 45 which is used in "IIP2 calibration mode" of RFIC according to the first embodiment of the invention shown in FIG. 1, and which serves to suppress harmonics with respect to the signal of the frequency $f_{IIP2}$.

FIG. 7 is a diagram showing the frequency spectrum of an output signal of the low-pass filter (LPF) 45 which is used in "IIP2 calibration mode" of RFIC according to the first embodiment of the invention shown in FIG. 1, and which serves to suppress harmonics with respect to the signal of the frequency $f_{IIP2}$.

The frequency characteristic curve 70 shown in FIG. 7 shows the frequency characteristic of the low-pass filter (LPF) 45. In the drawing, odd harmonics $f_{IIP2} \times 3$ and $f_{IIP2} \times 5$ are also shown. However, if the frequency characteristic curve of the low-pass filter (LPF) 45 is remarkably steep and the amount of attenuation is close to the ideal, these harmonics can be suppressed totally.

The sine-wave signal of the frequency $f_{IIP2}$ output by the low-pass filter (LPF) 45 is supplied to the test-signal-generating mixer 20 through the switch 39. On the other hand, the test-signal-generating mixer 20 accepts input of a local signal of a frequency of $f_{TXLO}$ in an RF transmit-frequency band, which the divider 21 has produced by dividing an oscillating output signal from the transmit-voltage-control oscillator (TXVCO) 22. Therefore, the test-signal-generating mixer 20 forms a two-tone signal having a frequency of ($f_{IIP2} \pm f_{TXLO}$). The two-tone signal for IIP2 calibration is for simulating the transmit interfering wave of about −30 dBm. Therefore, assuming the gain of the low-noise amplifier (LNA) 1 to be 25 dB, it is required to generate a two-tone test signal having a signal level of −5 dBm. However, in some cases, it is difficult to generate a two-tone signal of a relatively large signal power level of −5 dBm with a low distortion, which depends on the structure of the test-signal-generating mixer 20. On this account, RFIC is arranged as follows. The variable-gain amplifier (PGA) 43 is connected with an output of the test-signal-generating mixer 20, and the variable-gain amplifier (PGA) 43 is put in charge of linearly amplifying the two-tone signal output by the test-signal-generating mixer 20.

Figure 8:
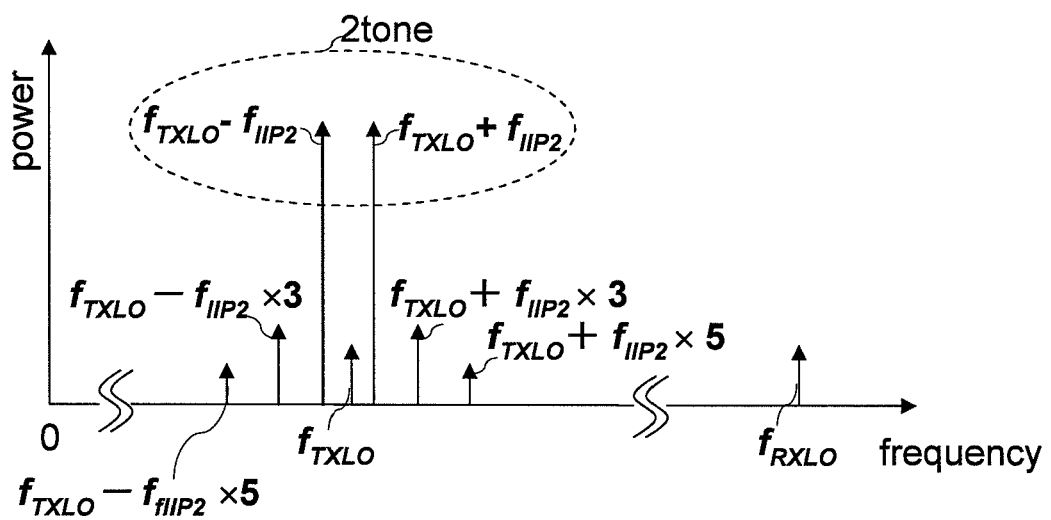
FIG. 8 is a diagram showing the frequency spectrum of an output signal of the variable-gain amplifier (PGA) 43 used in "IIP2 calibration mode" of RFIC according to the first embodiment of the invention shown in FIG. 1.

FIG. 8 is a diagram showing the frequency spectrum of an output signal of variable-gain amplifier (PGA) 43 used in "IIP2 calibration mode" of RFIC according to the first embodiment of the invention shown in FIG. 1.

In the drawing, the two-tone signal which consists of frequency signals arising at frequencies of $f_{TXLO}-f_{IIP2}$, and $f_{TXLO}+f_{IIP2}$, as well as the frequency spectra resulting from multiplications of odd harmonics at the frequencies $f_{IIP2} \times 3$ and $f_{IIP2} \times 5$ with the RF transmit frequency $f_{TXLO}$ are shown. However, if the frequency characteristic curve of the low-pass filter (LPF) 45, i.e. the frequency characteristic curve 70 shown in FIG. 7, is remarkably steep and the amount of attenuation is close to the ideal, influences of the harmonics can be suppressed almost totally.

The two-tone signal, which has been amplified by the variable-gain amplifier (PGA) 43 in signal power, is passed through the output of the variable-gain amplifier (PGA) 43 and the switch 2, and then input to the receive mixers 3 and 4. At this time, the pair of receive mixers 3 and 4 has been involved in a simulation of the receive operation, and are being supplied with an RF receive local signal having the frequency $f_{RXLO}$ of the RF receive-frequency band, which has been produced by the receive-voltage-control oscillator (RX-VCO) 19, divider 18 and 90-degree phase shifter 17.

In case that the receive mixers 3 and 4 forming a differential pair have an unbalance therebetween, the influence of the second-order intermodulation distortion components (IM2 components) produced by the receive mixers 3 and 4 arise on the outputs of a direct current component (DC), and harmonic components including $f_{IIP2} \times 2$ and $f_{IIP2} \times 4$. However, the harmonics including $f_{IIP2} \times 2$ and $f_{TXLO} \times 2$ can be filtered out by the pair of low-pass filters (LPF) 5 and 6. Further, the pair of receive mixers 3 and 4 outputs a signal having a frequency component, e.g. $f_{RXLO}+(f_{TXLO}+f_{IIP2})$ because an input signal thereto is multiplied by a receive local signal having the frequency of $f_{RXLO}$ and by the two-tone signal having spectra of the frequencies $f_{TXLO}+f_{IIP2}$ and $f_{TXLO}-f_{IIP2}$. However, the frequencies $f_{RXLO}$ and $f_{TXLO}$ belong to RF receive band and RF transmit band, respectively, and signals having these high frequencies can be filtered out by the low-pass filters (LPF) 5 and 6.

Figure 9:
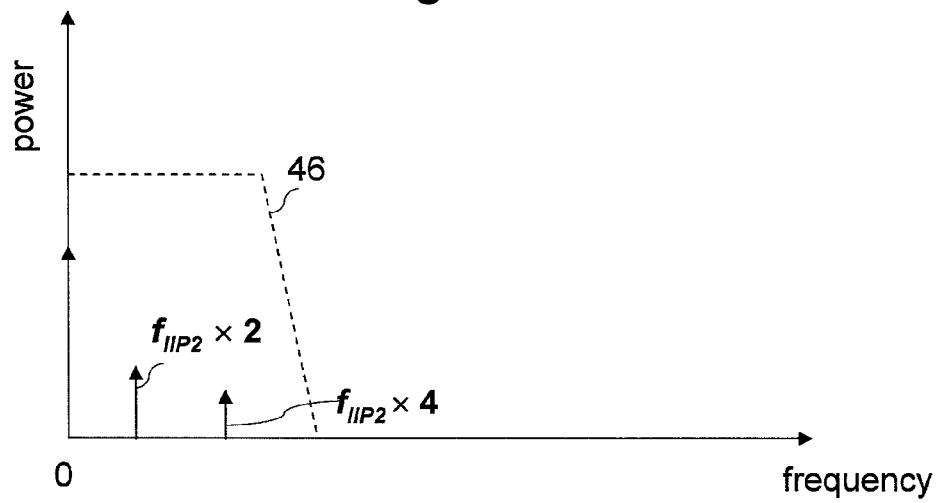
FIG. 9 is a diagram showing the frequency spectra of output signals of the pair of low-pass filters (LPF) 5 and 6 in "IIP2 calibration mode" of RFIC according to the first embodiment of the invention shown in FIG. 1.

FIG. 9 is a diagram showing the frequency spectra of output signals of the pair of low-pass filters (LPF) 5 and 6 in "IIP2 calibration mode" of RFIC according to the first embodiment of the invention shown in FIG. 1.

In the drawing, the frequency characteristic curve 46 represents the frequency characteristic of the pair of low-pass filters (LPF) 5 and 6. As in the drawing, the influence of the second-order intermodulation distortion components (IM2 components) arises on the direct current component (DC) and appears as harmonic components, e.g. the frequency spectra $f_{IIP2} \times 2$ and $f_{IIP2} \times 4$. Now, it is noted that the harmonic component $f_{IIP2} \times 4$ is a component which arises on condition that the low-pass filter (LPF) 45 does not work sufficiently in suppression of harmonics as described with reference to FIG. 7.

In "IIP2 calibration mode", during which the operation of calibrating the second-order input intercept point (IIP2) is executed, the peak value or power of a signal of the frequency $f_{IIP2} \times 2$ making the second-order intermodulation distortion component (IM2 component) is detected to make a search for the setting condition of the pair of receive mixers 3 and 4, which minimizes the peak value or power. The harmonic component of the frequency $f_{IIP2} \times 4$ deteriorates the accuracy of the detection. Therefore, the higher, the capability of suppressing harmonics of the low-pass filter (LPF) 45 is, the higher the accuracy of the detection can be made.

The second-order intermodulation distortion components (IM2 components) output by the pair of low-pass filters (LPF) 5 and 6 are amplified by the pair of variable-gain amplifiers (PGA) 7 and 8. In this step, the gain set by the gain controller 16 serving to control the gain of the pair of variable-gain amplifiers (PGA) 7 and 8 is e.g. the maximum gain. With an extremely small level of the second-order intermodulation distortion component (IM2 component) output by the pair of receive mixers 3 and 4, it is required to prevent IM2 components from being buried in quantization noises of the analog-to-digital converters (ADC) 9 and 10. Therefore, it is preferable to set the gain of the pair of variable-gain amplifiers (PGA) 7 and 8 to a higher value. However, if a mechanism capable of variably changing parameters of the receive mixers 3 and 4 in the operation of calibrating the second-order input intercept point (IIP2), i.e. in "IIP2 calibration mode", is brought into reality by means for variably controlling the load resistance value of the pair of receive mixers 3 and 4, the output DC offset of the pair of receive mixers 3 and 4 can fluctuate depending on the timing of the variable control. As a result, the fluctuating output DC offset of the pair of receive mixers 3 and 4 can cause the output level of the pair of variable-gain amplifiers (PGA) 7 and 8 to shift out of the input dynamic range of the pair of analog-to-digital converters (ADC) 9 and 10. Also, in the case of materializing a mechanism capable of variably changing the parameter of the pair of receive mixers 3 and 4 by means for variably controlling the bias voltage of the pair of receive mixers 3 and 4, the same problem can occur. For the reasons described above, in the case of the invention, the DC offset calibration circuit 71 executes the operation of calibrating the DC offset in order to cancel the DC offset voltage of the pair of variable-gain amplifiers (PGA) 7 and 8 every time the setting information of the pair of receive mixers 3 and 4 is updated during the period of "IIP2 calibration mode".

The second-order intermodulation distortion component (IM2 component) amplified by the pair of variable-gain amplifiers (PGA) 7 and 8 is converted to a digital signal by the pair of analog-to-digital converters (ADC) 9 and 10. Then, the noise in the digital signal is filtered out by the pair of digital low-pass filters (LPF) 11 and 12. The resultant digital signal is supplied to the IIP2 calibration circuit 42.

<<IIP2 Calibration Circuit>>

Figure 24:
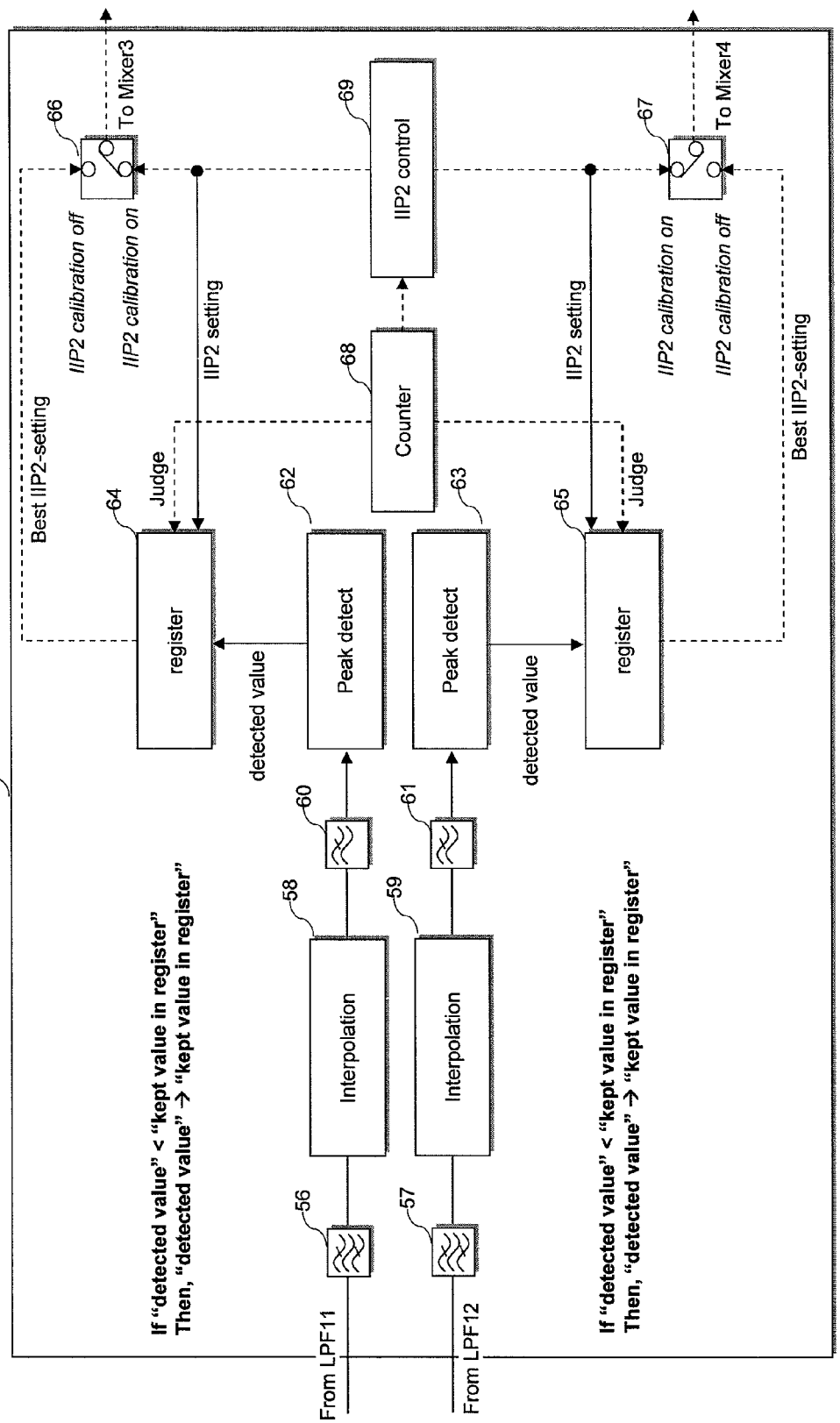
FIG. 24 is diagram showing the structure of the IIP2 calibration circuit 42 for executing the calibrating operation in "IIP2 calibration mode" in the RFIC according to the first embodiment of the invention shown in FIG. 1.

FIG. 24 is a diagram showing a structure of the IIP2 calibration circuit 42 for actually performing an action to conduct in "IIP2 calibration mode" in RFIC according to the first embodiment of the invention shown in FIG. 1.

As shown in the drawing, the IIP2 calibration circuit 42 includes: a pair of digital band-pass filters (BPF) 56 and 57; a pair of interpolation circuit 58 and 59; a pair of digital low-pass filters (LPF) 60 and 61; a pair of peak-detection circuits 62 and 63; a pair of control registers 64 and 65; a pair of switches 66 and 67; a counter 68; and an IIP2 controller 69.

A second-order intermodulation distortion component (IM2 component) produced and output by the pair of digital low-pass filters (LPF) 11 and 12 goes through the filter-out of noise components by the pair of digital band-pass filters (BPF) 56 and 57, then upsampling and signal interpolation by the pair of interpolation circuits 58 and 59, and further filter-out of noise and harmonics components by the pair of digital low-pass filters (LPF) 60 and 61.

Figure 10:
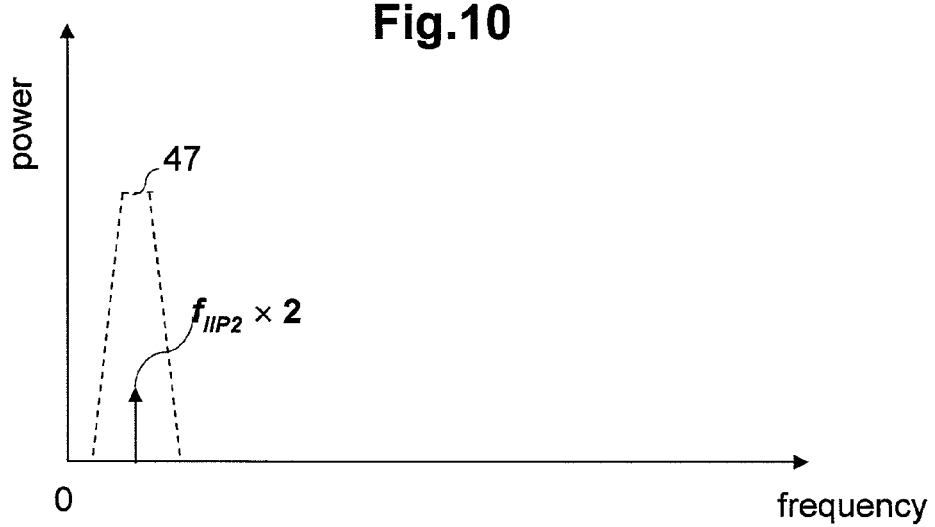
FIG. 10 is a diagram showing the frequency spectra of output signals of the pair of digital low-pass filters (LPF) 11 and 12 in "IIP2 calibration mode" of RFIC according to the first embodiment of the invention shown in FIG. 1.

FIG. 10 is a diagram showing the frequency spectra of output signals of the pair of digital low-pass filters (LPF) 11 and 12 in "IIP2 calibration mode" of RFIC according to the first embodiment of the invention shown in FIG. 1.

The frequency characteristic curve 47 of FIG. 10 corresponds to the frequency characteristic curve of the pair of digital band-pass filters (BPF) 56 and 57 of the IIP2 calibration circuit 42 shown in FIG. 24.

As shown in FIG. 10, a direct current component (DC), a harmonic component $f_{IIP2} \times 4$, a noise component, quantization noise and the like as shown in FIG. 9 are suppressed by the pair of digital band-pass filters (BPF) 56 and 57, whereas the frequency component of $F_{IIP2} \times 2$, which is a second-order intermodulation distortion component (IM2 component) to be detected as described with reference to FIG. 9, is selected by the frequency characteristic curve 47 of the pair of digital band-pass filters (BPF) 56 and 57.

The second-order intermodulation distortion components (IM2 components) output by the digital low-pass filters (LPF) 60 and 61 of the IIP2 calibration circuit 42 shown in FIG. 24 are supplied to inputs of the peak-detection circuits 62 and 63, where the peak values or average powers are detected. In the stage of the detection, time resolution of the sine waves has been raised thanks to the upsampling and signal interpolation executed by the pair of interpolation circuits 58 and 59. Therefore, the peak values or average powers can be detected with high accuracy. The peak values or average powers detected by the peak-detection circuits 62 and 63 are temporarily saved in the control registers 64 and 65 at intervals of a fixed length of time counted by the counter 68. In the step of saving the detected values in the respective control registers 64 and 65, a comparison is made between a peak value which has been already saved and the newly detected value. If the newly detected peak value or average power is smaller than the one stored in the preceding saving step, the newly detected peak value or average power, and the setting conditions (IIP2 set values) of the receive mixers 3 and 4 at that time will be saved. The setting conditions (IIP2 set value) of the pair of receive mixers 3 and 4 are updated by the IIP2 controller 69 at intervals of a fixed length of time counted by the counter 68, and in parallel, provided to the control registers 64 and 65 and supplied through the switches 66 and 67 to the pair of receive mixers 3 and 4.

As described above, the IIP2 controller 69 updates the set values of the receive mixers 3 and 4 at intervals of a fixed length of time counted by the counter 68, while the peak values or average powers of the second-order intermodulation distortion components (IM2 components) are detected, and the minimum set values are stored in the control registers 64 and 65. Finally, the set values when the best second-order distortion characteristic is achieved will be saved in the control registers 64 and 65. After the detection of the set values within a predetermined range has been finished, the IIP2 controller 69 controls the switches 66 and 67 so that the best set values are supplied to the mixers 3 and 4 from the control registers 64 and 65. Hence, at the beginning of "I-Q calibration mode" and the beginning of "Transmit/receive mode", the set values when the best second-order intermodulation distortion component (IM2 component) is achieved are supplied from the control registers 64 and 65 to the receive mixers 3 and 4, and thus the results of calibration in IIP2 calibration mode" are reflected on the receive mixers 3 and 4.

Further, in "IIP2 calibration mode", in order to simulate the entry of a transmit interfering wave during a receive operation, the RF transmit local frequency $f_{TXLO}$ and RF receive local frequency $f_{RXLO}$ are set to a frequency of RF transmit-frequency band and a frequency of RF receive-frequency band respectively. Now, it is noted that even in "IIP2 calibration mode", the digital interfaces 14 and 37 stay in service to keep communication with the baseband processor.

<<IQ Mismatch Calibration Mode>>

Figure 3:
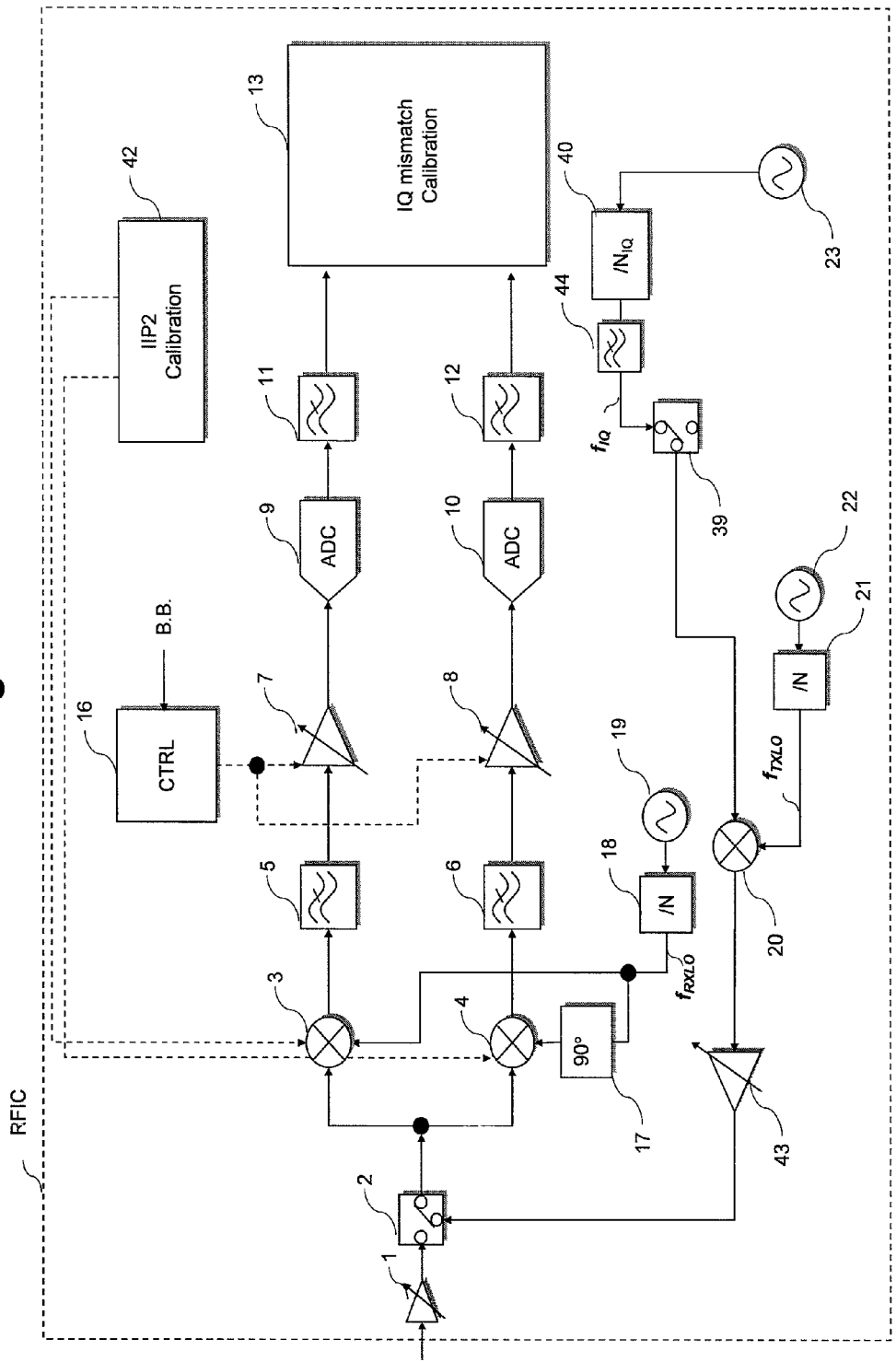
FIG. 3 is a diagram for explaining an operation of RFIC according to the first embodiment of the invention shown in FIG. 1 in "IQ mismatch calibration mode"

Referring to FIG. 3, the operation of RFIC according to the first embodiment of the invention shown in FIG. 1 in "IQ mismatch calibration mode" will be described. Now, it is noted that of constituent members in RFIC shown in FIG. 1, only circuit parts associated with the members working in IQ mismatch calibration mode are shown in FIG. 3.

The digital-interface-voltage-control oscillator (VCO) 23 generates an oscillating signal. Then, the divider 40 divides the oscillating signal to produce a clock signal having a frequency of $f_{IQ}$. After that, the low-pass filter (LPF) 44 suppresses harmonics with respect to the frequency $f_{IQ}$ to make the clock signal closer to an ideal sine wave.

Figure 11:
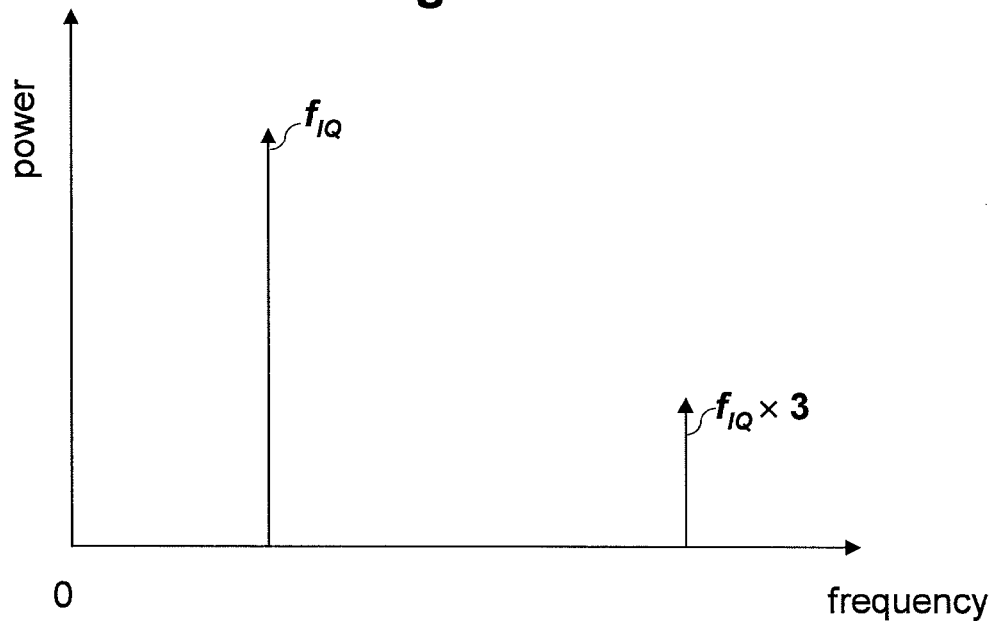
FIG. 11 is a diagram showing the frequency spectra of output signals of the low-pass filter (LPF) 44 which is used in "IQ mismatch calibration mode" of RFIC according to the first embodiment of the invention shown in FIG. 1, and which serves to suppress harmonics with respect to the signal of the frequency $f_{IQ}$.

FIG. 11 is a diagram showing the frequency spectra of output signals of the low-pass filter (LPF) 44 which is used in "IQ mismatch calibration mode" of RFIC according to the first embodiment of the invention shown in FIG. 1, and which serves to suppress harmonics with respect to the signal of the frequency $f_{IQ}$.

As seen from FIG. 3, the sine-wave signal of the frequency $f_{IQ}$ output by the low-pass filter (LPF) 44 is thereafter supplied to the test-signal-generating mixer 20 through the switch 39. On the other hand, the test-signal-generating mixer 20 accepts input of a local signal of a frequency of $f_{TXLO}$ in an RF transmit-frequency band, which the divider 21 has produced by dividing an oscillating output signal from the transmit-voltage-control oscillator (TXVCO) 22. Therefore, the test-signal-generating mixer 20 forms a two-tone signal having a frequency of $(f_{IQ} \pm f_{TXLO})$.

A test signal for IQ mismatch calibration is used to simulate an RF receive signal, and therefore it does not need a large electric power unlike a test signal for IIP2 calibration. Hence, the variable-gain amplifier (PGA) 43 amplifies a test signal produced by the test-signal-generating mixer 20 with a gain lower than the gain in IIP2 calibration mode, or attenuates the test signal.

Figure 12:
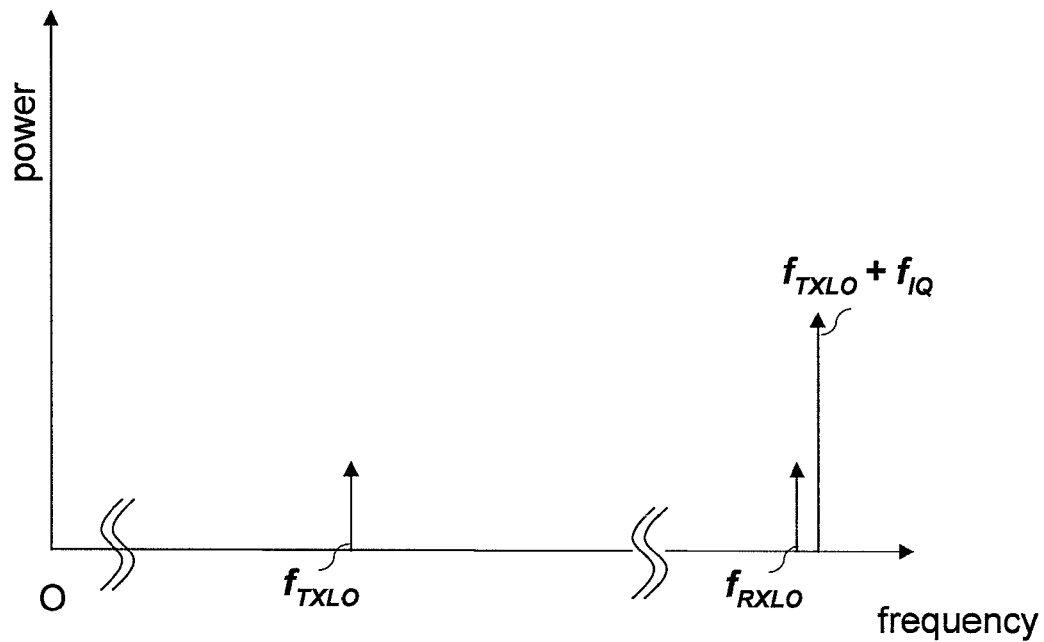
FIG. 12 is a diagram showing the frequency spectra of output signals of the variable-gain amplifier (PGA) 43 used in "IQ mismatch calibration mode" of RFIC according to the first embodiment of the invention shown in FIG. 1, and connected with the test-signal-generating mixer 20.

FIG. 12 is a diagram showing the frequency spectra of output signals of the variable-gain amplifier (PGA) 43 used in "IQ mismatch calibration mode" of RFIC according to the first embodiment of the invention shown in FIG. 1, and connected with the test-signal-generating mixer 20.

Simulated as the RF receive signal is only a signal having the frequency $f_{IQ}+f_{TXLO}$. A signal having the frequency $f_{IQ}-f_{TXLO}$ is suppressed by the low-pass filters (LPF) 5 and 6 after the frequency conversion in the pair of receive mixers 3 and 4, which is to be described later. On this account, a signal having the frequency $f_{IQ}-f_{TXLO}$ is not shown in FIG. 12. In other words, the test-signal-generating mixer 20 outputs a two-tone signal having the frequencies $f_{IQ}+f_{TXLO}$ and $f_{IQ}-f_{TXLO}$ in reality, however the test signal used in an actual IQ mismatch calibration consists of a signal having the frequency $f_{IQ}+f_{TXLO}$. Therefore, a signal of the frequency $f_{IQ}-f_{TXLO}$ has no effect on the operation of IQ mismatch calibration substantially, and using the two-tone signal is equivalent to using a one-tone signal. Although during the operation of IQ mismatch calibration, a one-tone signal which simulates an RF receive signal must be supplied to the receiver with a small power because of use of a convergence algorithm, a test signal formed in the way as described above meets this requirement.

A test signal having the frequency $f_{IQ}+f_{TXLO}$, which the variable-gain amplifier (PGA) 43 outputs, is supplied to the pair of receive mixers 3 and 4 through the switch 2. At this time, as the receive operation is simulated, the receive mixers 3 and 4 have been supplied with an RF receive local signal of the frequency $f_{RXLO}$ of RF receive-frequency band produced by a combination of the receive-voltage-control oscillator (RXVCO) 19, divider 18 and 90-degree phase shifter 17.

Therefore, a test signal of the frequency $f_{IQ}+f_{TXLO}$ is multiplied by an RF receive local signal of the frequency $f_{RXLO}$, and converted, in frequency, down into a signal having the frequency $f_{IQ}+f_{TXLO}-f_{RXLO}$. Incidentally, at this point, the receive mixers 3 and 4 have been set to have best set values determined in IIP2 calibration mode, which are the setting conditions of the receive mixers 3 and 4 when the best second-order distortion characteristic was achieved. After that, the pair of low-pass filters (LPF) 5 and 6 selectively output the down-converted signal having the frequency $f_{IQ}+f_{TXLO}-f_{RXLO}$. While a signal having the higher frequency $f_{IQ}+f_{TXLO}+f_{RXLO}$ is also included in the output of the pair of receive mixers 3 and 4, such higher-frequency signal is suppressed by the pair of low-pass filters (LPF) 5 and 6.

The down-converted signals of the frequency $f_{IQ}+f_{TXLO}-f_{RXLO}$ arising from the outputs of the low-pass filters (LPF) 5 and 6 are supplied to the variable-gain amplifiers (PGA) 7 and 8, and then to the analog-to-digital converters (ADC) 9 and 10, where the signals are converted to digital signals. The resultant digital signals are subjected to the filter-out of noise by the digital low-pass filters (LPF) 11 and 12, and then input to the IQ mismatch-calibration circuit 13. During the operation in "IQ mismatch calibration mode", the gain controller 16 sets the gains of the pair of variable-gain amplifiers (PGA) 7 and 8 to fixed values so that the test signal of the frequency $f_{IQ}+f_{TXLO}-f_{RXLO}$ never exceeds the input dynamic range of the pair of analog-to-digital converters (ADC) 9 and 10.

Figure 13:
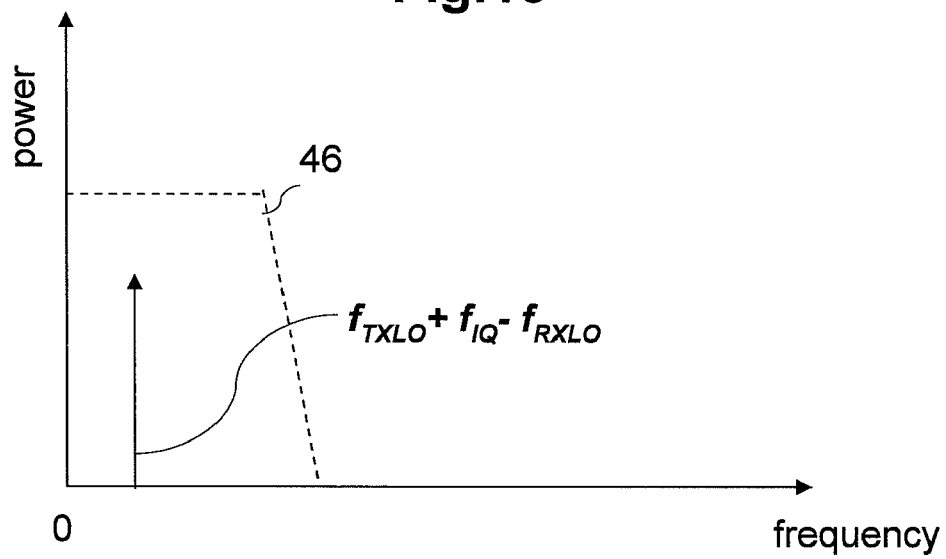
FIG. 13 is a diagram showing the frequency spectra of output signals of the pair of low-pass filters (LPF) 5 and 6 in "IQ mismatch calibration mode" of RFIC according to the first embodiment of the invention shown in FIG. 1.

FIG. 13 is a diagram showing the frequency spectra of output signals of the pair of low-pass filters (LPF) 5 and 6 in "IQ mismatch calibration mode" of RFIC according to the first embodiment of the invention shown in FIG. 1. In the drawing, the frequency characteristic curve 46 represents the frequency characteristic of the pair of low-pass filters (LPF) 5 and 6.

Figure 14:
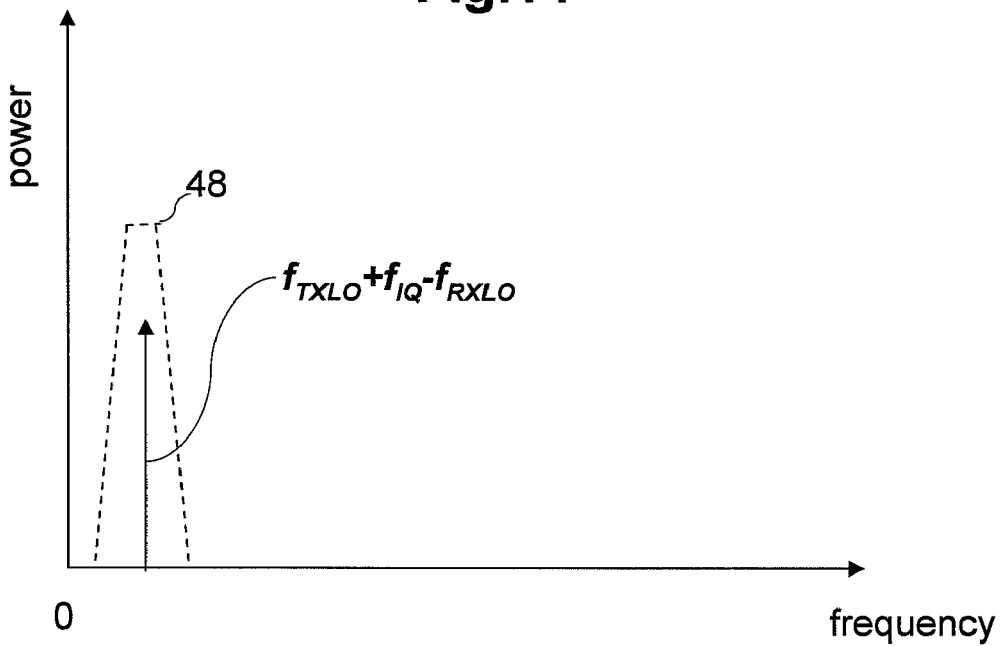
FIG. 14 is a diagram showing the frequency spectra of output signals of the pair of digital low-pass filters (LPF) 11 and 12 in the "IQ mismatch calibration mode" of RFIC according to the first embodiment of the invention shown in FIG. 1.

FIG. 14 is a diagram showing the frequency spectra of output signals of the pair of digital low-pass filters (LPF) 11 and 12 in the "IQ mismatch calibration mode" of RFIC according to the first embodiment of the invention shown in FIG. 1.

In the drawing, the frequency characteristic 48 represents the frequency characteristic of a pair of digital band-pass filters (BPF) 13_7 and 13_8 of the IQ mismatch-calibration circuit 13 shown in FIG. 25, which will be described later.

<<IQ Mismatch-Calibration Circuit>>

Figure 25:
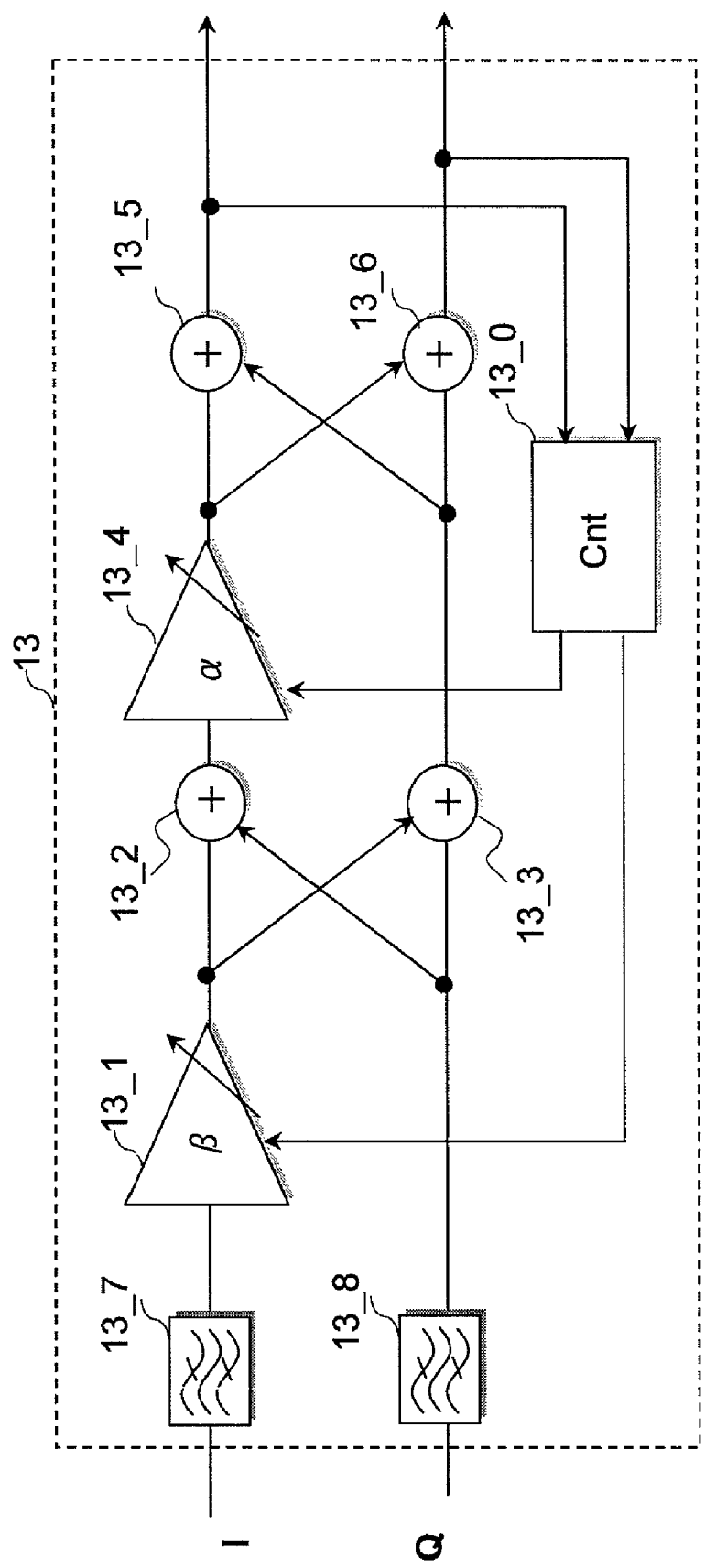
FIG. 25 is a diagram showing an example of the structure of the IQ mismatch-calibration circuit 13 of RFIC according to the first embodiment of the invention shown in FIG. 1.

FIG. 25 is a diagram showing an example of the structure of the IQ mismatch-calibration circuit 13 of RFIC according to the first embodiment of the invention shown in FIG. 1.

As shown in the drawing, the IQ mismatch-calibration circuit 13 includes: a control unit 13_0; an amplitude-correcting unit 13_1; adders 13_2, 13_3, 13_5 and 13_6; a phase-correcting unit 13_4; and digital band-pass filters (BPF) 13_7 and 13_8.

The pair of digital band-pass filter (BPF) 13_7 and 13_8 is provided to increase the accuracy of IQ mismatch calibration. The amplitude-correcting unit 13_1 and phase-correcting unit 13_4 are controlled by the control unit 13_0. The control unit 13_0 follows a fixed-time-convergence algorithm to calculate correction values for calibrating amplitude and phase errors. The amplitude-correcting unit 13_1 corrects the amplitude of a signal on a signal line for primarily conveying an in-phase component signal, according to the amplitude-correction value from the control unit 13_0. The phase-correcting unit 13_4 corrects the phase of a signal on a signal line for primarily conveying an in-phase component signal, according to the phase-correction value from the control unit 13_0. On a signal path constituted by the signal line for primarily conveying an in-phase component signal along and the signal line for primarily conveying a quadrature-phase component signal, the adders 13_2, 13_3, 13_5 and 13_6 are placed.

In the operation of IQ mismatch calibration by the IQ mismatch-calibration circuit 13 shown in FIG. 25, final correction values for IQ mismatch correction can be obtained by running the fixed-time-convergence algorithm. The IQ mismatch-calibration circuit 13 stores the final correction values in a control register of the control unit 13_0, and then terminates the calibrating operation in "IQ mismatch calibration mode".

During the periods of the calibrating operations in "IIP2 calibration mode" and "IQ mismatch calibration mode", the transmit RF local signal frequency $f_{TXLO}$ and receive RF local signal frequency $f_{RXLO}$ are not changed, and each remain an unchanged value. Therefore, the oscillator frequencies of the receive-voltage-control oscillator (RXVCO) 19 and transmit-voltage-control oscillator (TXVCO) 22 each remain an unchanged value during the periods of the calibrating operations. Further, even in "IQ mismatch calibration mode", the digital interfaces 14 and 37 keep working in order to maintain communication with the baseband processor.

<<Single Band-Enabled Calibration>>

FIG. 5 is a diagram showing a single band-enabled calibration sequence of actions executed by RFIC according to the first embodiment of the invention shown in FIG. 1.

According to the calibration sequence of actions shown in FIG. 5, the calibrating operation in "IIP2 calibration mode" and the calibrating operation in "IQ mismatch calibration mode" are executed immediately after power-on or receive idle or the end of a receive idle state.

On receipt of a trigger to start the calibration at Time T1, RFIC according to the first embodiment of the invention shown in FIG. 1 starts locking, in frequency, the transmit-voltage-control oscillator (TXVCO) 22 and receive-voltage-control oscillator (RXVCO) 19 so that they output the frequencies $f_{TXLO}$ and $f_{RXLO}$ respectively. In parallel, RFIC also starts locking, in frequency, the digital-interface-voltage-control oscillator (VCO) 23 so that it outputs a predetermined frequency. After having finished locking the frequencies of the voltage-control oscillators, RFIC goes into the calibrating operation in "IIP2 calibration mode" at Time T2. Then, the IIP2 calibration circuit 42 stores, in the control registers 64 and 65 thereinside, the setting information concerning the pair of receive mixers 3 and 4 when the best second-order distortion characteristic is achieved. Thus, the setting information when the best second-order distortion characteristic is achieved is reflected by the pair of receive mixers 3 and 4, and in this condition the calibrating operation in "IIP2 calibration mode" is terminated.

Thereafter the divider 40 for "IIP2 calibration mode" is turned off, and the divider 41 for "IQ mismatch calibration mode" is turned on. The transient response time required to switch between the dividers is herein defined as "wait time", during the wait time RFIC goes into "IQ mismatch calibration mode" from "IIP2 calibration mode".

On another note, a method including the step of correcting an unbalance between the receive mixers 3 and 4 forming a differential pair is adopted for the calibration in "IIP2 calibration mode", and therefore modifying the unbalanced state the differential pair of receive mixers 3 and can change the balance between RF receive local input terminals of the differential pair of receive mixers 3 and 4, causing a change in IQ mismatch. On this account, it is required that "IIP2 calibration mode" be executed just before "IQ mismatch calibration mode", and the operation in "IQ mismatch calibration mode" be conducted with the pair of mixers and 4 reflecting the result of calibration in "IIP2 calibration mode".

After the calibrating operation in "IQ mismatch calibration mode" is started, final correction values for an IQ mismatch can be determined by execution of the fixed-time-convergence algorithm during the operation of IQ mismatch calibration by the IQ mismatch-calibration circuit 13. After the final correction values is stored in the control registers, the calibrating operation in "IQ mismatch calibration mode" is terminated at Time T3.

In case that RFIC does not enter "Transmit/receive mode" after the end of "IQ mismatch calibration mode", RFIC goes into the idle state again, and the transmit-voltage-control oscillator (TXVCO) 22, receive-voltage-control oscillator (RXVCO) 19 and other transmit and receive circuits are turned off, however the result of IIP2 calibration and the result of IQ mismatch calibration remain saved in the control registers. After that, in case that RFIC goes into "Transmit/receive mode" at Time T4, the transmit-voltage-control oscillator (TXVCO) 22 and receive-voltage-control oscillator (RXVCO) 19 each start the action of frequency locking so as to set their oscillator frequencies to transmit and receive frequency channels specified by the baseband processor respectively. At this time, the result of IIP2 calibration and the result of IQ mismatch calibration have been already reflected by the pair of receive mixers and the IQ mismatch-calibration circuit respectively. Thus, it becomes possible to start communication between RFIC and a mobile phone base station at Time T5, promptly after finish of the locking of the transmit-voltage-control oscillator (TXVCO) 22 and receive-voltage-control oscillator (RXVCO) 19.

<<Multiband-Enabled Calibration>>

FIG. 6 is a diagram showing a multiband-enabled calibration sequence of actions executed by RFIC according to the first embodiment of the invention shown in FIG. 1.

As in the case of the single band-enabled calibration, according to the multiband-enabled calibration sequence of actions shown in FIG. 6, the calibrating operation in "IIP2 calibration mode" and the calibrating operation in "IQ mismatch calibration mode" are executed immediately after power-on or receive idle or the end of a receive idle state.

On receipt of a trigger to start the calibration at Time T1, RFIC according to the first embodiment of the invention shown in FIG. 1 starts locking, in frequency, the transmit-voltage-control oscillator (TXVCO) 22 and receive-voltage-control oscillator (RXVCO) 19 so that they output the frequencies $f_{TXLO}$ and $f_{RXLO}$ respectively. In parallel, RFIC also starts locking, in frequency, the digital-interface-voltage-control oscillator (VCO) 23 so that it outputs a predetermined frequency. After having finished locking the frequencies of the voltage-control oscillators, RFIC goes into the calibrating operation in "IIP2 calibration mode" at Time T2. Then, the IIP2 calibration circuit 42 stores, in the control registers 64 and 65 thereinside, the setting information concerning the pair of receive mixers 3 and 4 when the best second-order distortion characteristic is achieved. Thus, the setting information when the best second-order distortion characteristic is achieved is reflected by the pair of receive mixers 3 and 4, and in this condition the calibrating operation in "IIP2 calibration mode" is terminated.

Thereafter the divider 40 for "IIP2 calibration mode" is turned off, and the divider 41 for "IQ mismatch calibration mode" is turned on. The transient response time required to switch between the dividers is herein defined as "wait time", during the wait time RFIC goes into "IQ mismatch calibration mode" from "IIP2 calibration mode".

After the calibrating operation in "IQ mismatch calibration mode" is started, final correction values for an IQ mismatch can be determined by execution of the fixed-time-convergence algorithm during the operation of IQ mismatch calibration by the IQ mismatch-calibration circuit 13. After the final correction values is stored in the control registers, the calibrating operation in "IQ mismatch calibration mode" is terminated at Time T3.

To perform the calibration for another band immediately after the end of "IQ mismatch calibration mode" at Time T3, RFIC starts again locking, in frequency, the transmit-voltage-control oscillator (TXVCO) 22 and receive-voltage-control oscillator (RXVCO) 19 so that they respectively output the frequencies $f_{TXLO}$ and $f_{RXLO}$ for the band. At this time, the digital-interface-voltage-control oscillator (VCO) 23 remains locked in frequency, and therefore there is not need to lock the frequency of the oscillator 23 again.

After that, RFIC goes into "IIP2 calibration mode" and take action for the calibrating operation at Time T4. Consequently, the IIP2 calibration circuit 42 stores, in the control registers 64 and 65 thereinside, the setting information concerning the pair of receive mixers 3 and 4 when the best second-order distortion characteristic is achieved. Thus, the setting information when the best second-order distortion characteristic is achieved is reflected by the pair of receive mixers 3 and 4, and in this condition the calibrating operation in "IIP2 calibration mode" is terminated.

After that, the transient response time required to switch the divider 40 to divider 41 is defined as "wait time", during the wait time RFIC goes into "IQ mismatch calibration mode" from "IIP2 calibration mode".

After the calibrating operation in "IQ mismatch calibration mode" is started, final correction values for an IQ mismatch can be determined by execution of the fixed-time-convergence algorithm during the operation of IQ mismatch calibration by the IQ mismatch-calibration circuit 13. After the final correction values is stored in the control registers, the calibrating operation in "IQ mismatch calibration mode" is terminated at Time T5.

As in the single band-enabled sequence, in case that RFIC does not enter "transmit/receive mode" after the end of "IQ mismatch calibration mode", RFIC goes into the idle state again, and the transmit-voltage-control oscillator (TXVCO) 22, receive-voltage-control oscillator (RXVCO) 19 and other transmit and receive circuits are turned off, however the result of IIP2 calibration and the result of IQ mismatch calibration for each band remain saved in the control registers. After that, in case that RFIC goes into "Transmit/receive mode" at Time T5, the transmit-voltage-control oscillator (TXVCO) 22 and receive-voltage-control oscillator (RXVCO) 19 each start the action of frequency locking so as to set their oscillator frequencies to transmit and receive frequency channels specified by the baseband processor respectively. At this time, the results of IIP2 calibration and IQ mismatch calibration concerning the band specified by the baseband processor have been already reflected by the pair of receive mixers and the IQ mismatch-calibration circuit respectively. Thus, it becomes possible to start communication between RFIC and a mobile phone base station at Time T5, promptly after finish of the locking of the transmit-voltage-control oscillator (TXVCO) 22 and receive-voltage-control oscillator (RXVCO) 19.

As described above, RFIC according to the first embodiment of the invention shown in FIG. 1 supports "IIP2 calibration mode" and "IQ mismatch calibration mode" for transmit and receive in multiple bands based on WCDMA system. Therefore, as to each of multiple bands, an RF transmit frequency is set to a value lower than an RF receive frequency according to FDD (Frequency Division Duplex). Further, for each of multiple bands, after execution of the calibrating operation in "IIP2 calibration mode", the calibrating operation in "IQ mismatch calibration mode" is conducted in the condition that the result of the operation in "IIP2 calibration mode" has been reflected by the setting of the given constituent member of RFIC. Moreover, after the calibrating operations in "IIP2 calibration mode" and "IQ mismatch calibration mode" have been finished for one of multiple bands, RFIC starts again locking the frequencies of the transmit-voltage-control oscillator (TXVCO) 22 and receive-voltage-control oscillator (RXVCO) 19 so that the oscillators respectively output frequencies $f_{TXLO}$ and $f_{RXLO}$ for another band. After the frequencies have been locked, during the periods of the calibrating operations in "IIP2 calibration mode" and "IQ mismatch calibration mode", the transmit RF local signal frequency $f_{TXLO}$ and receive RF local signal frequency $f_{RXLO}$ are not changed, and each remain an unchanged value. Therefore, the oscillator frequencies of the receive-voltage-control oscillator (RXVCO) 19 and transmit-voltage-control oscillator (TXVCO) 22 each remain an unchanged value during the periods of the calibrating operations.

Second Embodiment

Figure 20:
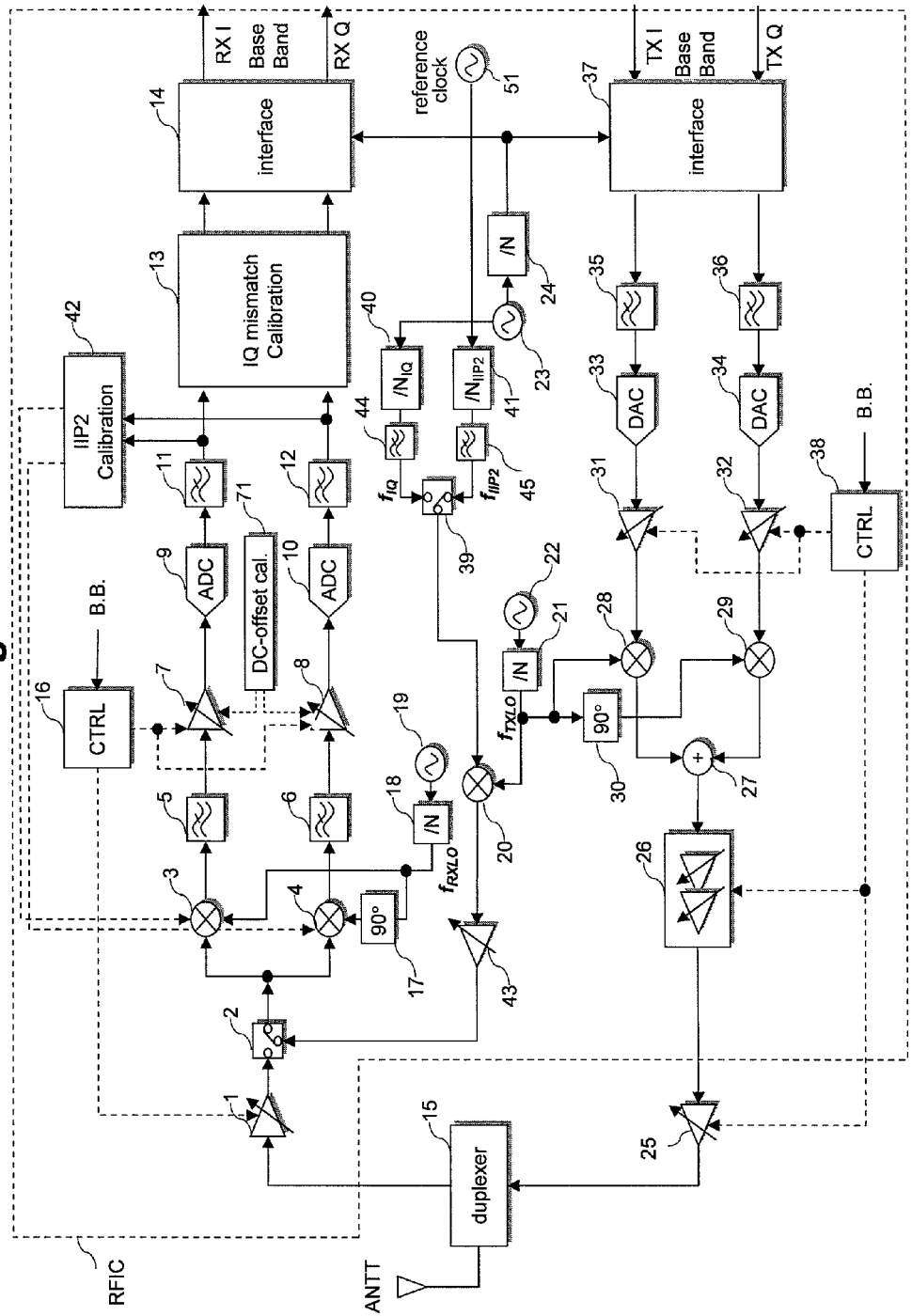
FIG. 20 is a diagram showing the structure of a radio-frequency semiconductor integrated circuit (RFIC) according to the second embodiment of the invention.

FIG. 20 is a diagram showing the structure of a radio-frequency semiconductor integrated circuit (RFIC) according to the second embodiment of the invention.

The difference between RFIC according to the second embodiment of the invention shown in FIG. 20, and RFIC according to the first embodiment of the invention shown in FIG. 1 is as follows.

In RFIC shown FIG. 1, an oscillating output signal which the digital-interface-voltage-control oscillator (VCO) 23 generates is supplied to input terminals of the divider 41 used in IIP2 calibration mode. However, in RFIC shown in FIG. 20, an oscillating output signal which a reference-signal source 51 outputs through output terminals thereof is supplied to the input terminals of the divider 41 used in IIP2 calibration mode.

The oscillating output signal from the reference-signal source 51 is divided by the divider 41, whereby a clock signal having the frequency $f_{IIP2}$ is produced. The clock signal of the frequency $f_{IIP2}$ is supplied to the low-pass filter (LPF) 45. Then, the low-pass filter (LPF) 45 suppresses harmonics of the signal of the frequency $f_{IIP2}$ thereby to make the waveform of the clock signal closer to an ideal sine wave. The oscillation frequency of the reference-signal source 51 is lower than the oscillation frequency of the digital-interface-voltage-control oscillator (VCO) 23. Therefore, the division number of the divider 41 of RFIC shown in FIG. 20 is smaller than that of the divider 41 of RFIC shown in FIG. 1, and RFIC shown in FIG. 20 can reduce the circuit scale of the divider 41.

In other features, RFIC according to the second embodiment of the invention shown in FIG. 20 is identical to RFIC according to the first embodiment of the invention shown in FIG. 1. Therefore, the repeated descriptions thereof are avoided here.

Third Embodiment

Figure 21:
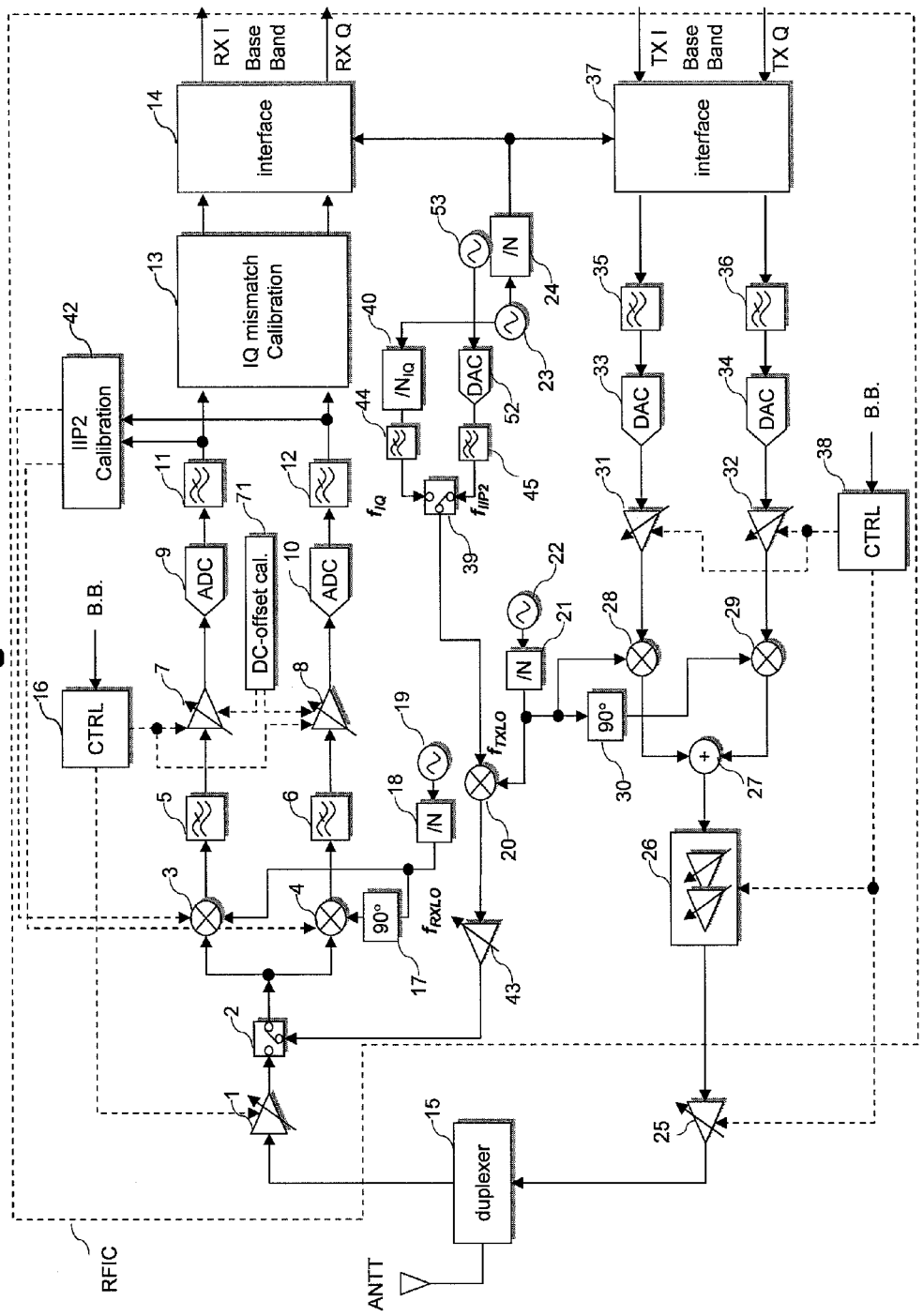
FIG. 21 is a diagram showing the structure of a radio-frequency semiconductor integrated circuit (RFIC) according to the third embodiment of the invention.

FIG. 21 is a diagram showing the structure of a radio-frequency semiconductor integrated circuit (RFIC) according to the third embodiment of the invention.

The difference between RFIC according to the third embodiment of the invention shown in FIG. 21, and RFIC according to the first embodiment of the invention shown in FIG. 1 is as follows.

In RFIC shown FIG. 1, an oscillating output signal which the digital-interface-voltage-control oscillator (VCO) 23 generates is supplied to the input terminals of the divider 41 used in IIP2 calibration mode. However, in RFIC shown in FIG. 21, the digital-to-analog converter (DAC) 52 and digital sine-wave signal source 53 are connected to the input terminals of the divider 41 used in IIP2 calibration mode.

In the calibrating operation in "IIP2 calibration mode", digital sine wave data generated by the digital sine-wave signal source 53 is supplied to the digital-to-analog converter 52. In response to it, the digital-to-analog converter 52 outputs an analog sine-wave signal with the frequency $f_{IIP2}$. The analog sine-wave signal having the frequency $f_{IIP2}$ is supplied to the low-pass filter (LPF) 45. Then, the low-pass filter (LPF) 45 suppresses harmonics of the signal of the frequency $f_{IIP2}$ thereby to make the waveform of the signal closer to an ideal sine wave. To form a sine wave from a clock signal, it is necessary for the low-pass filter (LPF) 45 to have a steep frequency characteristic. Using the digital-to-analog converter (DAC) 52 and digital sine-wave signal source 53 of RFIC shown in FIG. 21 to form a sine wave, the restriction of the frequency characteristic of the low-pass filter (LPF) 45 can be eased, and consequently the chip footprint of RFIC can be reduced. Now, it is noted that the digital-to-analog converter 52 may be arranged to serve as e.g. the pair of digital-to-analog converters (DAC) 33 and 34, and the digital-to-analog converter for controlling the power of the RF power amplifier (PA) 25, which are transmit circuit parts of RFIC. Further, the digital sine wave data from the digital sine-wave signal source 53 can be prepared readily by going through the steps of: previously storing the digital sine wave data in a table of a semiconductor memory (e.g. nonvolatile memory such as ROM) of the digital sine-wave signal source 53, and reading the data out of the memory during the period of IIP2 calibration mode.

In other features, RFIC according to the third embodiment of the invention shown in FIG. 21 is identical to RFIC according to the first embodiment of the invention shown in FIG. 1. Therefore, the repeated descriptions thereof are avoided here.

Fourth Embodiment

FIG. 22 is a diagram showing the structure of a radio-frequency semiconductor integrated circuit (RFIC) according to the fourth embodiment of the invention.

The difference between RFIC according to the fourth embodiment of the invention shown in FIG. 22, and RFIC according to the third embodiment of the invention shown in FIG. 21 is as follows.

In RFIC shown in FIG. 22, a spreading circuit 54 is additionally provided between the input terminals of the digital-to-analog converter (DAC) 52, and the output terminals of the digital sine-wave signal source 53, and a de-spreading circuit 55 is further provided between the output terminals of the digital low-pass filters (LPF) 11 and 12, and the input terminals of the IIP2 calibration circuit 42.

Therefore, in RFIC shown in FIG. 22, digital sine wave data which the digital sine-wave signal source 53 generates is subjected to code modulation by the spreading circuit 54, and then supplied to the digital-to-analog converter 52. In the spreading circuit 54, a code modulation compliant with DS-CDMA (Direct Sequence Code-Division Multiple Access) is executed by e.g. multiplying the digital sine wave data by a Walsh code. Therefore, the digital-to-analog converter 52 produces a CDMA-modulated wave signal. The frequency band of the CDMA-modulated wave signal output by the digital-to-analog converter 52 is restricted by the low-pass filter (LPF) 45. After that, the CDMA-modulated wave is supplied to the test-signal-generating mixer 20 through the switch 39. On the other hand, the test-signal-generating mixer 20 is also supplied with a local signal with the frequency $f_{TXLO}$, which the divider 21 produces by dividing, in frequency, a signal output by the transmit-voltage-control oscillator (TXVCO) 22. The test-signal-generating mixer 20 produces a CDMA-modulated signal with the frequency $f_{TXLO}$. The CDMA-modulated signal is amplified in power by the variable-gain amplifier (PGA) 43, and then input to the pair of receive mixers 3 and 4 through the switch 2. At this time, the pair of receive mixers 3 and 4 has been involved in a simulation of the RF receive operation, the pair of receive mixers 3 and 4 is supplied with a receive RF local signal having the frequency $f_{RXLO}$, which is produced by a combination of the receive-voltage-control oscillator (RXVCO) 19, divider 18, and 90-degree phase shifter 17.

In case that the receive mixers 3 and 4 forming a differential pair have an unbalance therebetween, the second-order intermodulation distortion component (IM2 component) arises on the output of a direct current component (DC) and the output of a component with the frequency $2 \times f_{RXLO}$. The pair of low-pass filters (LPF) 5 and 6 suppresses the component of the frequency $2 \times f_{RXLO}$, and the direct current component (DC) is amplified by the pair of variable-gain amplifiers (PGA) 7 and 8. At the stage of the amplification, the gains set by the gain controller 16 serving to control the gains of the pair of variable-gain amplifiers (PGA) 7 and 8 have been made a maximum. The second-order intermodulation distortion component (IM2 component) amplified by the pair of variable-gain amplifiers (PGA) 7 and 8 is converted into a digital signal by the pair of analog-to-digital converters (ADC) 9 and 10, subjected to noise removal by the pair of digital low-pass filters (LPF) 11 and 12, and then demodulated by the de-spreading circuit 55. The demodulation in the de-spreading circuit 55 is enabled by multiplying the digital signal by the same Walsh code as that used by the spreading circuit 54. The second-order intermodulation distortion component (IM2 component), which has been de-spread by the de-spreading circuit 55, is supplied to the IIP2 calibration circuit 42. Thanks to the spreading gain of the spreading circuit 54 and de-spreading circuit 55, the second-order intermodulation distortion component (IM2 component) can keep a high S/N ratio with respect to thermal noise and quantization noise, and therefore it becomes possible to increase the accuracy of detection of the second-order intermodulation distortion component (IM2 component) in the IIP2 calibration circuit 42. Otherwise, the calibrating operations in "IIP2 calibration mode", and "IQ mismatch calibration mode", and the transmit and receive operations in "Transmit/receive mode" are the same as those performed in RFIC according to the first embodiment of the invention shown in FIG. 1, and the repeated descriptions thereof are avoided here.

Fifth Embodiment

FIG. 23 is a diagram showing the structure of a radio-frequency semiconductor integrated circuit (RFIC) according to the fifth embodiment of the invention.

The difference between RFIC according to the fifth embodiment of the invention shown in FIG. 23, and RFIC according to the first embodiment of the invention shown in FIG. 1 is as follows.

In RFIC shown in FIG. 1, the two-tone signal produced and output by the test-signal-generating mixer 20 is linearly amplified by the variable-gain amplifier (PGA) 43, and then supplied to the switch 2 connected between the output terminal of the low-noise amplifier (LNA) 1 and the input terminal of the pair of receive mixers 3 and 4. In contrast, in RFIC shown in FIG. 23, the variable-gain amplifier (PGA) 43 is not provided, and the switch 2 is connected between the output terminal of the duplexer 15 and the input terminal of the low-noise amplifier (LNA) 1. Further, in RFIC shown in FIG. 23, the two-tone signal output by the test-signal-generating mixer 20 is provided to the switch 2 connected with the input terminal of the low-noise amplifier (LNA) 1.

Therefore, the two-tone signal is amplified in power by the low-noise amplifier (LNA) 1, and then supplied to the pair of receive mixers 3 and 4. The operations executed in stages subsequent to the pair of receive mixers 3 and 4 are the same as those conducted in RFIC according to the first embodiment of the invention, and therefore the repeated descriptions thereof are avoided here. On another note, connecting a switch to the input terminal of the low-noise amplifier (LNA) 1 can deteriorate the noise characteristics. In such case, two low-noise amplifiers (LNA) having the same circuit parameters for receive and calibration may be integrated into the semiconductor chip of RFIC so that the low-noise amplifier (LNA) exclusively for calibration can be used during the calibrating operation.

The invention made by the inventor has been concretely described above focusing on various embodiments thereof. However, the invention is not limited to the embodiments. It will be obvious that various changes and modifications thereof may be made without departing from the subject matter thereof.

For example, in regard to RFIC shown in FIG. 1 the dividers 40 and 41 may be constituted by one digital counter. In such case, it is preferable to take the steps of: eliminating the switch 39, and making variable the cutoff frequency of the low-pass filters (LPF) 44 and 45 by means of variable capacitances or the like.

Further, in regard to RFIC shown in FIG. 1, the function of the pair of receive mixers 3 and 4 is not limited to the function according to the direct-conversion method, by which an amplified RF signal from the low-noise amplifier 1 is converted into a baseband signal consisting of a pair of in-phase component (I) and quadrature-phase component (Q). The low-IF method, by which the pair of receive mixers 3 and 4 is used to convert an RF receive signal into a low-IF signal (IF: intermediate frequency) may be adopted for RFIC shown in FIG. 1.

What is claimed is:

1. A semiconductor integrated communication circuit to be mounted in a radio communication terminal device, and configured to perform radio frequency communication with a base station in transmit and receive modes, the semiconductor integrated communication circuit comprising:
    a low-noise amplifier;
    a receive mixer;
    a receive-voltage-control oscillator;
    a demodulation-signal-processing circuit;
    a modulation-signal-processing circuit;
    a transmit mixer;
    a transmit-voltage-control oscillator; and
    a set of a second-order-distortion-characteristic-calibration circuit, a quadrature-receive-signal-calibration circuit, and a test-signal generator, the set allowing the communication circuit to work in a second-order-distortion-characteristic-calibration mode, and a quadrature-receive-signal-calibration mode,
    wherein the low-noise amplifier amplifies an RF receive signal received through an antenna of the radio communication terminal device,
    wherein the receive mixer accepts supply of the amplified RF signal from the low-noise amplifier through one input terminal thereof, and supply of an RF receive local signal produced in response to an oscillating output signal of the receive-voltage-control oscillator through the other input terminal,
    wherein the demodulation-signal-processing circuit processes a quadrature-demodulation-receive signal output from an output terminal of the receive mixer thereby to produce a quadrature receive signal,
    wherein, in the receive mode, the receive mixer and demodulation-signal-processing circuit take charge of processing the RF receive signal,
    wherein the modulation-signal-processing circuit handles a quadrature transmit signal,
    wherein the transmit mixer accepts supply of a quadrature transmit output signal from the modulation-signal-processing circuit through one input terminal thereof, and supply of an RF transmit local signal produced in response to an oscillating output signal of the transmit-voltage-control oscillator through the other input terminal,
    wherein, in the transmit mode, the transmit mixer produces and outputs an RF transmit signal in response to an oscillating output signal from the transmit-voltage-control oscillator,
    wherein the test-signal generator produces a first test signal used in the second-order-distortion-characteristic-calibration mode, and a second test signal used in the quadrature-receive-signal-calibration mode, using an oscillating output signal from the transmit-voltage-control oscillator,
    wherein, in the second-order-distortion-characteristic-calibration mode, the second-order-distortion-characteristic-calibration circuit variably changes an operation parameter of the receive mixer, thereby to calibrate a second-order distortion characteristic to achieve its best condition while the first test signal from the test-signal generator is supplied to the receive mixer, and
    wherein, in the quadrature-receive-signal-calibration mode, the quadrature-receive-signal-calibration circuit calibrates phase and amplitude mismatches between an in-phase and a quadrature-phase component of the quadrature receive signal produced by the demodulation-signal-processing circuit to achieve a best condition of the signal while the second test signal from the test-signal generator is supplied to the receive mixer.

2. The semiconductor integrated communication circuit according to claim 1,
    wherein the low-noise amplifier, receive mixer, receive-voltage-control oscillator, and demodulation-signal-processing circuit constitute one receiver of a direct-down-conversion receiver and a low-IF receiver, and
    wherein no surface-acoustic-wave filter is connected to one of input and output terminals of the low-noise amplifier of the one receiver.

3. The semiconductor integrated communication circuit according to claim 2, further comprising:
    a DC offset calibration circuit connected with the demodulation-signal-processing circuit,
    wherein the DC offset calibration circuit executes a DC-offset-calibrating operation for calibrating DC offsets of the in-phase and quadrature-phase components of the quadrature receive signal produced by the demodulation-signal-processing circuit, and
    wherein, in the
    second-order-distortion-characteristic-calibration mode, the DC offset calibration circuit executes the DC-offset-calibrating operation every time the second-order-distortion-characteristic-calibration circuit variably changes the operation parameter of the receive mixer.

4. The semiconductor integrated communication circuit according to claim 3, wherein, after power-on of the semiconductor integrated communication circuit, an operation mode of the semiconductor integrated communication circuit is caused to transition in order of the second-order-distortion-characteristic-calibration mode, the quadrature-receive-signal-calibration mode, and the transmit/receive mode in turn, wherein the quadrature-receive-signal-calibration mode is enabled after the calibration of the second-order distortion characteristic to achieve its best condition, which involves the receive mixer, in the second-order-distortion-characteristic-calibration mode, and wherein the transmit and receive modes are enabled after the calibration of the second-order distortion characteristic to achieve its best condition, which involves the receive mixer, in the second-order-distortion-characteristic-calibration mode, and after the calibration of the quadrature receive signal to achieve the best condition of the signal in the quadrature-receive-signal-calibration mode.

5. The semiconductor integrated communication circuit according to claim 4, further comprising:
a function for performing a radio frequency communication with a base station using multiple bands,
wherein the operation mode of the semiconductor integrated communication circuit is caused to transition in order of the second-order-distortion-characteristic-calibration mode, and the quadrature-receive-signal-calibration mode in turn for each of the multiple bands.

6. The semiconductor integrated communication circuit according to claim 5, further comprising:
an additional oscillator,
wherein the test-signal generator produces the first test signal used in the second-order-distortion-characteristic-calibration mode, and the second test signal used in the quadrature-receive-signal-calibration mode, using an oscillating output signal from the additional oscillator, and the oscillating output signal from the transmit-voltage-control oscillator.

7. The semiconductor integrated communication circuit according to claim 6,
wherein the additional oscillator is one of a voltage-control oscillator used by a digital interface, a reference-signal source, and a digital sine-wave signal source.

8. The semiconductor integrated communication circuit according to claim 7,
wherein the additional oscillator is the digital sine-wave signal source,
the semiconductor integrated communication circuit further comprising:
a spreading circuit connected between an input terminal of the test-signal generator and an output terminal of the digital sine-wave signal source; and
a de-spreading circuit connected between an output terminal of the demodulation-signal-processing circuit and an input terminal of the second-order-distortion-characteristic-calibration circuit.

9. The semiconductor integrated communication circuit according to claim 7, further comprising:
a test-signal switch; and
a test-signal-variable-gain amplifier,
wherein the first and second test signals which the test-signal generator generates and outputs through an output terminal thereof can be supplied to an input terminal of the test-signal-variable-gain amplifier, and
wherein first and second amplified signals which the test-signal-variable-gain amplifier generates and outputs through an output terminal thereof can be supplied to the receive mixer through the test-signal switch.

10. The semiconductor integrated communication circuit according to claim 7, further comprising:
a test-signal switch connected between an output terminal of the test-signal generator and an input terminal of the low-noise amplifier,
wherein the first and second test signals which the test-signal generator generates and outputs through the output terminal thereof can be supplied to the input terminal of the low-noise amplifier through the test-signal switch.

11. A method of operating a semiconductor integrated communication circuit to be mounted in a radio communication terminal device, and configured to perform radio frequency communication with a base station in transmit and receive modes, the semiconductor integrated communication circuit comprising:
a low-noise amplifier;
a receive mixer;
a receive-voltage-control oscillator;
a demodulation-signal-processing circuit;
a modulation-signal-processing circuit;
a transmit mixer;
a transmit-voltage-control oscillator; and
a set of a second-order-distortion-characteristic-calibration circuit, a quadrature-receive-signal-calibration circuit, and a test-signal generator, the set allowing the communication circuit to work in a second-order-distortion-characteristic-calibration mode, and a quadrature-receive-signal-calibration mode,
wherein the low-noise amplifier amplifies an RF receive signal received through an antenna of the radio communication terminal device,
wherein the receive mixer accepts supply of amplified RF signal from the low-noise amplifier through one input terminal thereof, and supply of an RF receive local signal produced in response to an oscillating output signal of the receive-voltage-control oscillator through the other input terminal,
wherein the demodulation-signal-processing circuit processes a quadrature-demodulation-receive signal output from an output terminal of the receive mixer thereby to produce a quadrature receive signal,
wherein, in the receive mode, the receive mixer and demodulation-signal-processing circuit take charge of processing the RF receive signal,
wherein the modulation-signal-processing circuit handles a quadrature transmit signal,
wherein the transmit mixer accepts supply of a quadrature transmit output signal from the modulation-signal-processing circuit through one input terminal thereof, and supply of an RF transmit local signal produced in response to an oscillating output signal of the transmit-voltage-control oscillator through the other input terminal,
wherein, in the transmit mode, the transmit mixer produces and outputs an RF transmit signal in response to an oscillating output signal from the transmit-voltage-control oscillator, and
wherein the test-signal generator produces a first test signal used in the second-order-distortion-characteristic-calibration mode, and a second test signal used in the quadrature-receive-signal-calibration mode, using an oscillating output signal from the transmit-voltage-control oscillator, and
wherein the method of operating the semiconductor integrated communication circuit comprises the steps of:

using the second-order-distortion-characteristic-calibration circuit, in the second-order-distortion-characteristic-calibration mode, to variably change an operation parameter of the receive mixer, thereby to calibrate a second-order distortion characteristic to achieve its best condition while the first test signal from the test-signal generator is supplied to the receive mixer; and using the quadrature-receive-signal-calibration circuit, in the quadrature-receive-signal-calibration mode, to calibrate phase and amplitude mismatches between in-phase and quadrature-phase components of the quadrature receive signal produced by the demodulation-signal-processing circuit to achieve a best condition of the signal while the second test signal from the test-signal generator is supplied to the receive mixer.

12. The method of operating a semiconductor integrated communication circuit according to claim 11,
wherein the low-noise amplifier, receive mixer, receive-voltage-control oscillator, and demodulation-signal-processing circuit constitute one receiver of a direct-down-conversion receiver and a low-IF receiver, and
wherein no surface-acoustic-wave filter is connected to one of input and output terminals of the low-noise amplifier of the one receiver.

13. The method of operating a semiconductor integrated communication circuit according to claim 12,
wherein the semiconductor integrated communication circuit further comprises a DC offset calibration circuit connected with the demodulation-signal-processing circuit,
wherein the DC offset calibration circuit executes a DC-offset-calibrating operation for calibrating DC offsets of the in-phase and quadrature-phase components of the quadrature receive signal produced by the demodulation-signal-processing circuit, and
wherein, in the second-order-distortion-characteristic-calibration mode, the DC offset calibration circuit executes the DC-offset-calibrating operation every time the second-order-distortion-characteristic-calibration circuit variably changes the operation parameter of the receive mixer.

14. The method of operating a semiconductor integrated communication circuit according to claim 13,
wherein, after power-on of the semiconductor integrated communication circuit, an operation mode of the semiconductor integrated communication circuit is caused to transition in order of the second-order-distortion-characteristic-calibration mode, the quadrature-receive-signal-calibration mode, and the transmit/receive mode in turn,
wherein the quadrature-receive-signal-calibration mode is enabled after the calibration of the second-order distortion characteristic to achieve its best condition, which involves the receive mixer, in the second-order-distortion-characteristic-calibration mode, and
wherein the transmit and receive modes are enabled after the calibration of the second-order distortion characteristic to achieve its best condition, which involves the receive mixer, in the second-order-distortion-characteristic-calibration mode, and after the calibration of the quadrature receive signal to achieve the best condition of the signal in the quadrature-receive-signal-calibration mode.

15. The method of operating a semiconductor integrated communication circuit according to claim 14,
wherein the semiconductor integrated communication circuit further comprises a function for performing a radio frequency communication with a base station using multiple bands, and
wherein the operation mode of the semiconductor integrated communication circuit is caused to transition in order of the second-order-distortion-characteristic-calibration mode, and the quadrature-receive-signal-calibration mode in turn for each of the multiple bands.

16. The method of operating a semiconductor integrated communication circuit according to claim 15,
wherein the semiconductor integrated communication circuit further comprises an additional oscillator, and
wherein the test-signal generator produces the first test signal used in the second-order-distortion-characteristic-calibration mode, and the second test signal used in the quadrature-receive-signal-calibration mode, using an oscillating output signal from the additional oscillator, and the oscillating output signal from the transmit-voltage-control oscillator.

17. The method of operating a semiconductor integrated communication circuit according to claim 16,
wherein the additional oscillator is one of a voltage-control oscillator used by a digital interface, a reference-signal source, and a digital sine-wave signal source.

18. The method of operating a semiconductor integrated communication circuit according to claim 17,
wherein the second oscillator is the digital sine-wave signal source, and
wherein the semiconductor integrated communication circuit further comprises:
a spreading circuit connected between an input terminal of the test-signal generator and an output terminal of the digital sine-wave signal source; and
a de-spreading circuit connected between an output terminal of the demodulation-signal-processing circuit and an input terminal of the second-order-distortion-characteristic-calibration circuit.

19. The method of operating a semiconductor integrated communication circuit according to claim 17,
wherein the semiconductor integrated communication circuit further comprises:
a test-signal switch; and
a test-signal-variable-gain amplifier,
wherein the first and second test signals which the test-signal generator generates and outputs through an output terminal thereof can be supplied to an input terminal of the test-signal-variable-gain amplifier, and
wherein first and second test amplified signals which the test-signal-variable-gain amplifier generates and outputs through an output terminal thereof can be supplied to the receive mixer through the test-signal switch.

20. The method of operating a semiconductor integrated communication circuit according to claim 17,
wherein the semiconductor integrated communication circuit further comprises a test-signal switch connected between an output terminal of the test-signal generator and an input terminal of the low-noise amplifier, and
wherein the first and second test signals which the test-signal generator generates and outputs through the output terminal thereof can be supplied to the input terminal of the low-noise amplifier through the test-signal switch.

* * * * *